United States Patent
Gurlahosur et al.

(10) Patent No.: US 10,511,226 B1
(45) Date of Patent: Dec. 17, 2019

(54) SYSTEMS, METHODS, AND APPARATUS FOR REGULATING A SWITCHED MODE POWER SUPPLY

(71) Applicant: Texas Instruments Incorporated, Dallas, TX (US)

(72) Inventors: Sanjay Gurlahosur, Campbell, CA (US); Karen Huimun Chan, South San Francisco, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/352,610

(22) Filed: Mar. 13, 2019

(51) Int. Cl.
  *G05F 3/16* (2006.01)
  *H02M 3/158* (2006.01)
  *H02M 1/084* (2006.01)

(52) U.S. Cl.
  CPC ......... *H02M 3/1582* (2013.01); *H02M 1/084* (2013.01)

(58) Field of Classification Search
  CPC .... H02M 3/1582; H02M 1/084; H02M 3/156; H02M 2001/0009; H05B 33/0815
  USPC ......... 323/207, 246.266, 282–284, 312–315; 315/127, 300, 350
  See application file for complete search history.

(56) References Cited

U.S. PATENT DOCUMENTS

| | | | |
|---|---|---|---|
| 8,270,190 B2 * | 9/2012 | Adragna | G05F 1/70 323/222 |
| 8,810,294 B2 * | 8/2014 | Lynch | H03F 3/45475 327/172 |
| 9,509,215 B2 * | 11/2016 | Walters | H05B 33/0815 |
| 9,588,532 B2 * | 3/2017 | Rahimi | G05F 1/625 |
| 9,647,552 B2 * | 5/2017 | Li | H02M 3/158 |

* cited by examiner

*Primary Examiner* — Rajnikant B Patel
(74) *Attorney, Agent, or Firm* — Tuenlap Chan; Charles A. Brill; Frank D. Cimino

(57) ABSTRACT

Methods, apparatus, systems, and articles of manufacture are disclosed to regulate a switched mode power supply. An example power converter includes a first comparator, a ramp generator coupled to a first input of the first comparator, and a current balance circuit coupled to the ramp generator, the current balance circuit including a transistor including a first current terminal, a second current terminal, and a gate, a multiplier circuit coupled to the first current terminal, a second comparator coupled to the gate, a first current source coupled to the first current terminal and the multiplier circuit, and a second current source coupled to the second current terminal and the second comparator.

20 Claims, 12 Drawing Sheets

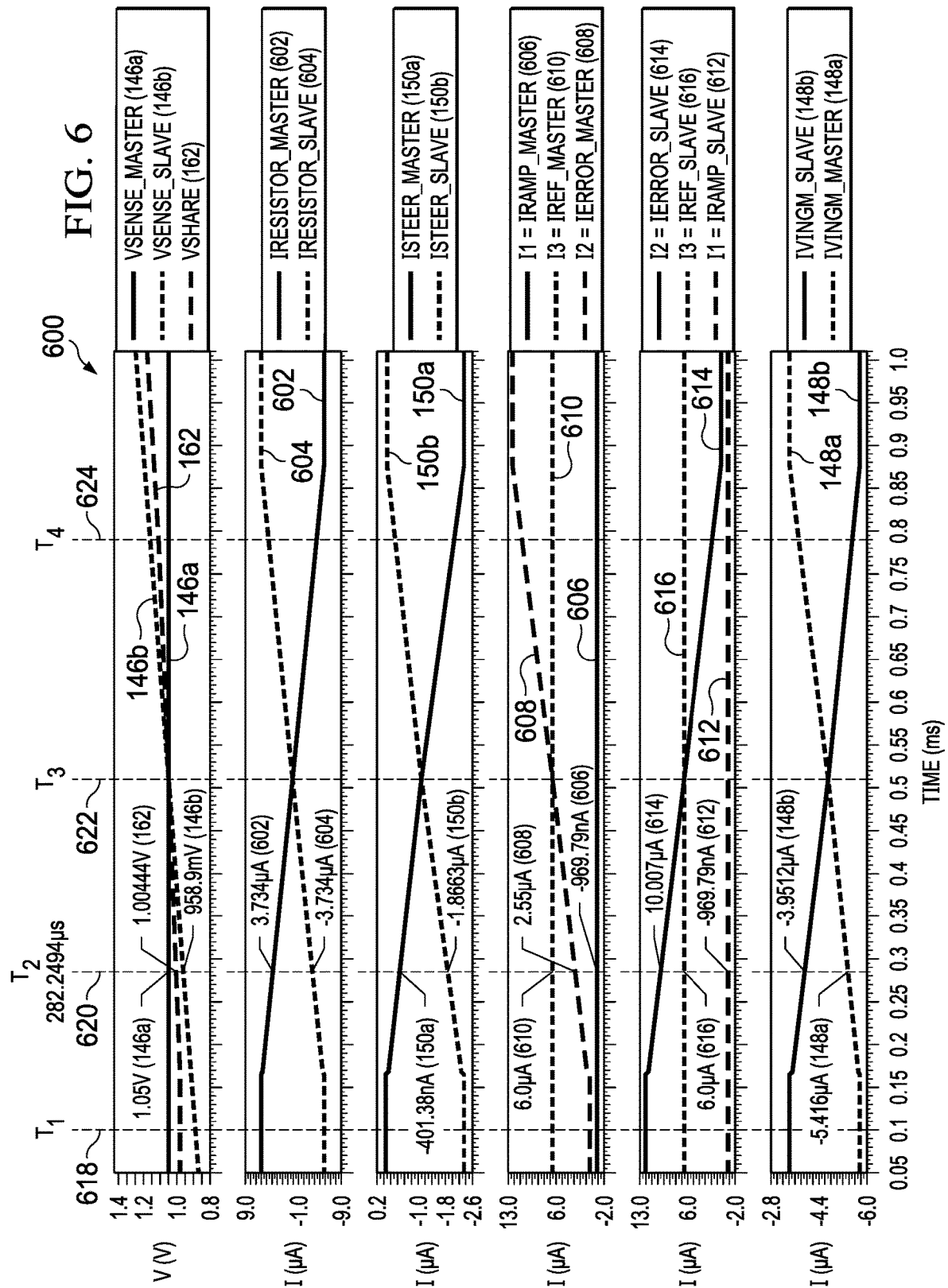

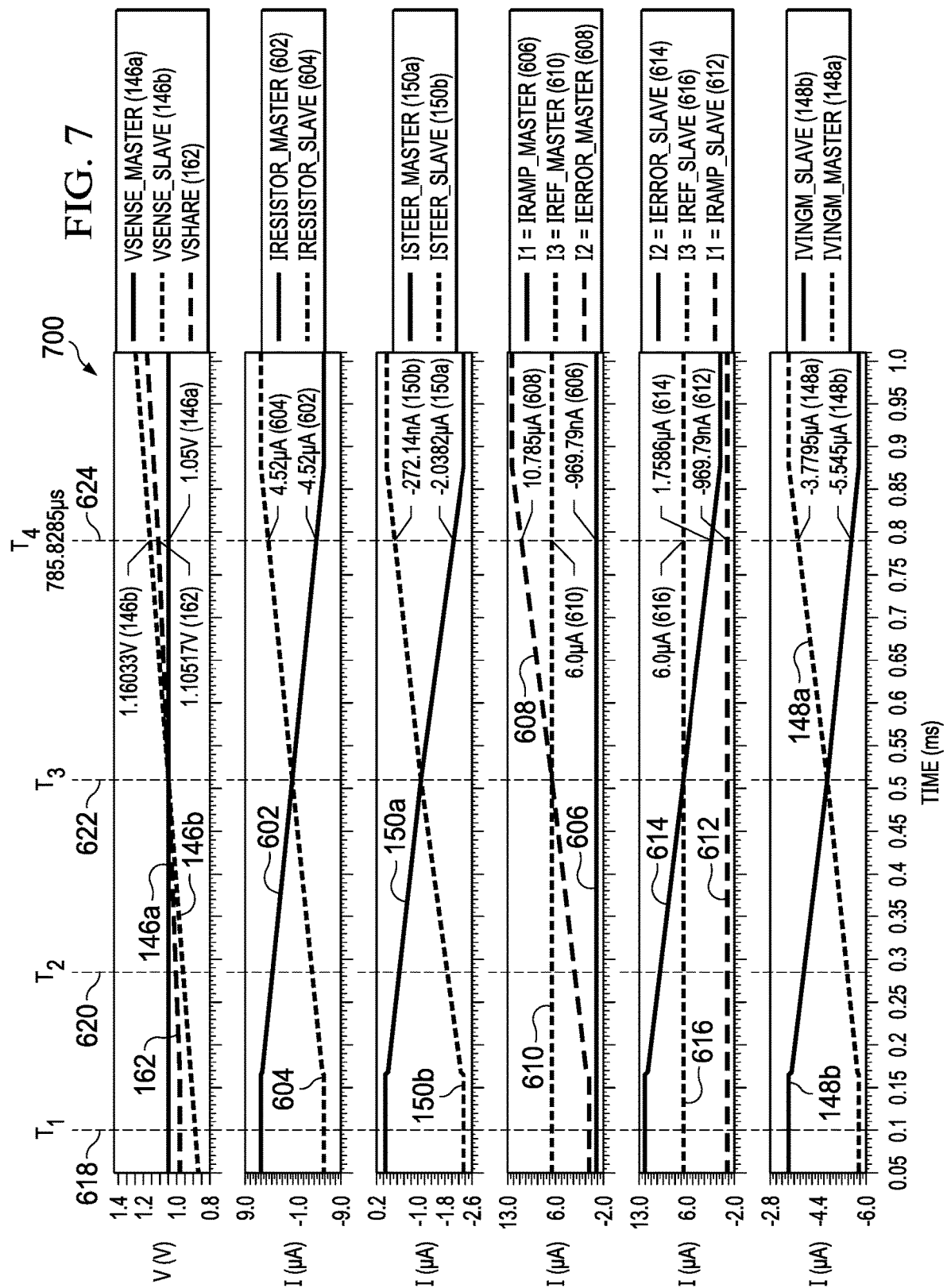

SYSTEMS, METHODS, AND APPARATUS FOR REGULATING A SWITCHED MODE POWER SUPPLY

FIELD OF THE DISCLOSURE

This disclosure relates generally to power converters and, more particularly, to systems, methods, and apparatus for regulating a switched mode power supply.

BACKGROUND

A power converter is a circuit that is used in various devices to convert an input voltage to a desired output voltage. For example, a buck converter converts an input voltage into a lower output voltage by controlling transistors and/or switches to charge and/or discharge inductors and/or capacitors to maintain the desired output voltage. Buck converters may be used in telecommunications applications to reduce an input voltage to an output voltage with low-noise and high-accuracy precision.

BRIEF DESCRIPTION OF THE DRAWINGS

FIGS. 6-7 depict example timing diagrams corresponding to operation of the first example power conversion system of FIG. 1 including the example ramp control circuit of FIG. 4.

Figure 1:
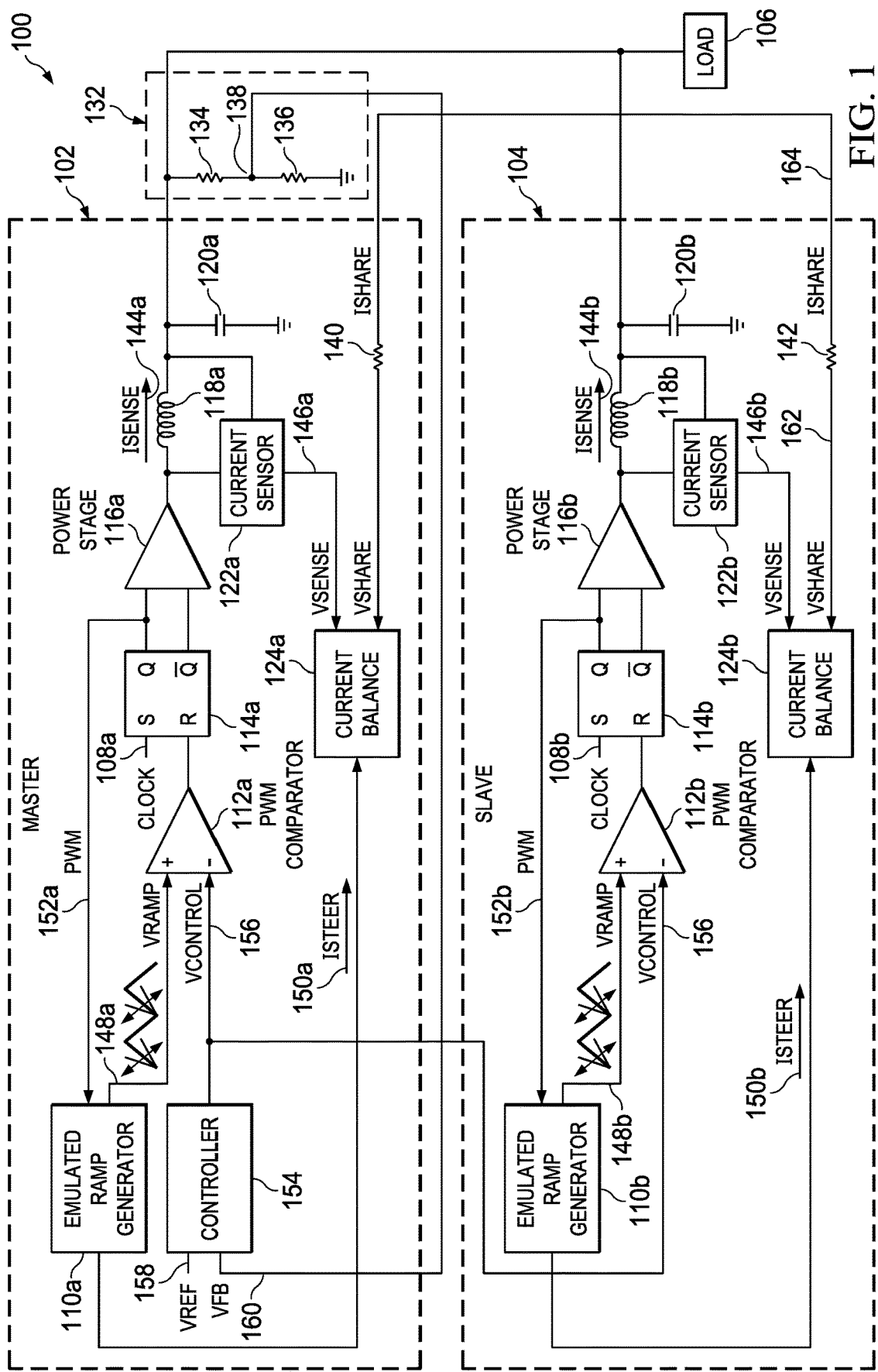
FIG. 1 is a schematic illustration of a first example power conversion system including an example emulated ramp generator and an example current balance circuit to control an example power stage of an example power converter.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A switched mode power supply (SMPS) is a power conversion system that includes one or more switched mode power converters (e.g., a boost converter, a buck converter, a buck-boost converter, etc.) to convert a first voltage (e.g., an input voltage) to a second voltage (e.g., an output voltage). When multiple switched mode power converters are stacked together in a multiphase configuration (e.g., a multiphase power conversion system), the multiple phases of the SMPS can provide more power to a load compared to a single phase SMPS that includes only one switched mode power converter. Preferably, when two or more switched mode power converters are used, each of the switched mode power converters is to provide the same quantity of current to the load. However, manufacturing and/or operation variations in one or more components (e.g., an LC filter, a transistor, etc.) of the switched mode power converters, and/or, more generally, an integrated circuit (IC) including the switched mode power converters, can cause differences in a quantity of the respective currents provided to the load. Such differences can cause a phase of the switched mode power converters to overheat if the phase provides a substantial portion of the current to the load.

Some multiphase power conversion systems include a master phase and one or more slave phases. The master phase may correspond to a first device configured as a master (e.g., a master IC) and the one or more slave phases may correspond to one or more second devices configured as slave(s) (e.g., a slave IC). The master IC may obtain feedback information (e.g., the output voltage) and invoke a controller to generate a control voltage to adjust the output voltage based on the feedback information. The master IC may set a duty cycle of a transistor of the master IC based on a comparison of the control voltage and a first ramp voltage. Typically, when the master IC and the slave IC are in a stacked configuration, the control voltage is passed from the master IC to the one or more slave ICs. The one or more slave ICs do not have the feedback information but generate second ramp voltages and use the control voltage from the master IC to generate the same duty cycle as the master IC for transistors of the one or more slave ICs.

A mismatch between a first output (e.g., a direct current (DC) output) of the master phase and second output(s) of the slave phase(s) may occur due to process variations in the IC, the LC filters, etc., of the master IC and/or the slave IC(s). The mismatch may cause different duty cycles to be generated for the master IC and for the slave IC(s). Accordingly, a first phase of the phases may provide more current than the second phase because of the process variations. Disadvantageously, the first phase, which provides more current than the second phase, can trigger a current limit of the SMPS or cause a thermal shutdown of the first phase or both phases because the process variations can cause the first phase to provide a substantial portion of current provided to a load.

As disclosed herein, some multiphase power conversion systems adjust a duty cycle of a phase including one or more transistors based on measuring inductor currents (e.g., the output currents of the phases). The duty cycle of the phases may be adjusted until the output currents are balanced with respect to a reference current. Such multiphase power conversion systems may include current balance circuitry to steer a current (ISTEER) away from an inverting input of a pulse-width-modulation (PWM) comparator included in the phases. The current balance circuitry determines a quantity of measured current based on a difference between the reference current and a measured one of the inductor currents. When a non-inverting input of the PWM comparator is the same for each of the phases, the inverting input can be adjusted to change an on-time of each phase until the output currents are balanced (e.g., measured current is equal to the reference current). The duty cycle is determined based on the difference between the reference current and the measured inductor currents. Accordingly, if the on-times of the phases are initially small to start, the correction of the on-time from the current balance circuitry may be a substantial percentage of the on-time. Thus, the current balance loop may be more sensitive and prone to instability as the on-time of the phase diminishes.

Examples disclosed herein include an example current balance circuit that regulates a multiphase SMPS by adjusting a rising slope (i.e., an upslope) of a ramp voltage (e.g., a voltage that decreases or increases in time) at a non-inverting input of a PWM comparator included in a corresponding power converter of the SMPS. For example, the upslope can correspond to an increase in voltage as a function of time (e.g., a ratio of voltage and a quantity of time). In other examples, the downslope can correspond to a decrease in voltage as a function of time (e.g., a ratio of voltage and a quantity of time). The upslope can be adjusted in both directions (e.g., increase or decrease the upslope) while keeping the control voltage fixed at an inverting input of the PWM comparator. Accordingly, the upslope and the downslope of the ramp voltage can follow the upslope and the downslope of an inductor current of the power converter when the input and output voltages are known. The upslope for the power converter can be adjusted based on a comparison of a reference current and the inductor current. The reference current can correspond to an average current of all phases of the SMPS to be regulated. By adjusting the upslope, a PWM pulse of each phase can adjust a corresponding one of the inductor currents until the inductor currents substantially balance.

In some disclosed examples, an error current is generated as the upslope changes with frequency, input voltage, and/or output voltage. In such disclosed examples, a multiplier circuit can be used to normalize the error current to generate ISTEER. ISTEER changes the upslope and adjusts a duty cycle of the corresponding phase until the error current becomes approximately zero. ISTEER adjusts an on-time of the power converter as a fixed quantity of the on-time. Advantageously, by adjusting the on-time as a fixed quantity of the on-time, a gain of the example current balance circuit is the same over an entire duty cycle range to improve stability of the SMPS when controlling the delivery of a desired current, voltage, etc., to a load.

FIG. 1 is a schematic illustration of a first example power conversion system 100 including a first example power converter 102 and a second example power converter 104 to provide power to an example load 106. In FIG. 1, the load 106 is hardware. For example, the load 106 can be a server, network hardware (e.g., a modem, a router, a switch, etc.), telecommunication equipment (e.g., a radio, an analog switch, a digital switch, a multiplexer, etc.), etc., and/or a combination thereof. Alternatively, the load 106 may be any other electrical device that requires power. In FIG. 1, the load 106 is coupled to the first power conversion system 100. Alternatively, the load 106 may not be coupled to the first power conversion system 100.

The first power conversion system 100 of the illustrated example of FIG. 1 facilitates delivery of a desired output voltage to the load 106 by balancing and/or otherwise regulating a quantity of current generated by the phases of the first power conversion system 100. For example, the first power conversion system 100 can reduce a first output current generated by the first power converter 102 and increase a second output current generated by the second power converter 104 when the first output current is greater than the second output current. In other examples, the first power conversion system 100 can increase the first output current and decrease the second output current when the first output current is less than the second output current.

The first power conversion system 100 of the illustrated example of FIG. 1 is a multiphase SMPS, where the first power converter 102 and the second power converter 104 are coupled and/or otherwise configured in a stack configuration. The first power converter 102 is an IC configured as a master device and, thus, a first output (e.g., the first output current, a first output voltage, etc.) of the first power converter 102 corresponds to an output of a master phase. The second power converter 104 is an IC configured as a slave device and, thus, a second output (e.g., the second output current, a second output voltage, etc.) of the second power converter 104 corresponds to an output of a slave phase. In FIG. 1, the master phase is a first phase and the slave phase is a second phase. Alternatively, the first power conversion system 100 may include fewer or more than two phases (e.g., fewer or more than the power converters 102, 104 depicted in FIG. 1).

In some examples, when the first power conversion system 100 is in the stacked configuration and the first power converter 102 is not in circuit with an external clock (e.g., an external device that generates a clock signal), a second example clock signal 108b of the second power converter 104 is synchronized to a first example clock signal 108a of the first power converter 102. In other examples, when the first power conversion system 100 is in the stacked configuration and in circuit with the external clock, the second clock signal 108b is synchronized to the first clock signal 108a which, in turn, is synchronized to the external clock.

In the illustrated example of FIG. 1, the power converters 102, 104 include a respective one of the following: a first example ramp generator (e.g., a first emulated ramp generator) 110a and a second example ramp generator (e.g., a second emulated ramp generator) 110b, a first example PWM generator 112a and a second example PWM generator 112b, a first example latch 114a and a second example latch 114b, a first example power stage 116a and a second example power stage 116b, a first example inductor 118a and a second example inductor 118b, a first example capacitor 120a and a second example capacitor 120b, a first example current sensor 122a and a second example current sensor 122b, and a first example current balance circuit 124a and a second example current balance circuit 124b.

In the illustrated example of FIG. 1, a respective one of the emulated ramp generators 110a-b is coupled to (1) a respective one of the current balance circuits 124a-b, (2) a first input of a respective one of the PWM comparators 112a-b, (3) a first output of a respective one of the latches 114a-b, and (4) a respective one of the power stages 116a-b. The power stages 116a-b include a high-side transistor (e.g., a metal-oxide-semiconductor field-effect transistor (MOSFET), a bi-polar junction transistor (BJT), etc.) and a low-side transistor. In FIG. 1, a second output of a respective one of the latches 114a-b is coupled to a respective one of the power stages 116a-b. In FIG. 1, an output of a respective one of the power stages 116a-b is coupled to (1) a first end of a respective one of the inductors 118a-b and (2) a respective one of the current sensors 122a-b. In FIG. 1, a second end of a respective one of the inductors 118a-b is coupled to (1) a respective one of the current sensors 122a-b, (2) a respective one of the capacitors 120a-b, and (3) the load 106.

In the illustrated example of FIG. 1, an example voltage divider 132 includes a first example resistor 134 coupled to a second example resistor 136. In FIG. 1, a first end of the first resistor 134 is coupled to the second end of the first inductor 118a, the first capacitor 120a, first current sensor 122a, the second power converter 104, and the load 106. In FIG. 1, a second end of the first resistor 134 is coupled to a first end of the second resistor 136 at an example feedback measurement node 138.

Further depicted in FIG. 1, an output of a respective one of the PWM comparators 112a-b is coupled to a reset input of a respective one of the latches 114a-b. The latches 114a-b of FIG. 1 are set-reset (SR) flip-flops. Alternatively, any other type of latch may be used. In FIG. 1, a respective one of the clock signals 108a-b is coupled to a set input of a respective one of the latches 114a-b. In FIG. 1, an output of a respective one of the current sensors 122a-b is coupled to a first input of a respective one of the current balance circuits 124a-b. In FIG. 1, a second input of the first current balance circuit 124a is coupled to a second input of the second current balance circuit 124b via a third example resistor 140 and a fourth example resistor 142.

The current sensors 122a-b of the illustrated example of FIG. 1 convert example sense currents (ISENSE) 144a-b flowing through the inductors 118a-b to example sense voltages (VSENSE) 146a-b. The sense currents 144a-b include a first ISENSE 144a flowing through the first inductor 118a and a second ISENSE 144b flowing through the second inductor 118b. The sense voltages 146a-b include a first VSENSE 146a and a second VSENSE 146b. The first VSENSE 146a is generated by the first current sensor 122a and transmitted to the first current balance circuit 124a. The second VSENSE 146b is generated by the second current sensor 122b and transmitted to the second current balance circuit 124b.

In the illustrated example of FIG. 1, the power converters 102, 104 include the emulated ramp generators 110a-b to generate and transmit example ramp signals (VRAMP) 148a-b to first inputs of the PWM comparators 112a-b. In some examples, the emulated ramp generators 110a-b correspond to an RC circuit. In FIG. 1, the first PWM comparator 112a generates the first ramp signal 148a and the second PWM comparator 112b generates the second ramp signal 148b. In FIG. 1, the ramp signals 148a-b are voltages. In some examples, the ramp signals 148a-b are the same while, in other examples, the ramp signals 148a-b are different. The emulated ramp generators 110a-b can adjust a rate of increase of the ramp signals 148a-b (e.g., an upslope of the ramp signals 148a-b) based on at least one of (1) example steering currents (ISTEER) 150a-b generated by the current balance circuits 124a-b and (2) example PWM signals 152a-b generated by the latches 114a-b. The steering currents 150a-b include a first ISTEER 150a generated by the first current balance circuit 124a and a second ISTEER 150b generated by the second current balance circuit 124b.

In the illustrated example of FIG. 1, the first power converter 102 includes an example controller 154 to generate and transmit an example control signal (VCONTROL) 156 to second inputs of the PWM comparators 112a-b. In FIG. 1, the first inputs of the PWM comparators 112a-b are non-inverting inputs and the second inputs are inverting inputs. Alternatively, the first power conversion system 100 may be implemented based on the first inputs being the inverting inputs and the second inputs being the non-inverting inputs. The control signal 156 is a voltage. The controller 154 generates the control signal 156 based on a difference between an example reference voltage (VREF) 158 and an example feedback voltage (VFB) 160, where VFB 160 corresponds to a voltage at the feedback measurement node 138.

In some examples, the controller 154 can be implemented using hardware logic, machine readable instructions, hardware implemented state machines, etc., and/or a combination thereof. For example, the controller 154 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). In other examples, the controller 154 can be implemented using a transconductance amplifier (i.e., a GM amplifier).

In operation, the controller 154 generates the control signal 156 as a voltage that, when exceeded, causes the PWM comparators 112a-b to assert a logic High (e.g., an analog voltage corresponding to a digital '1'). For example, the controller 154 can generate a first voltage as the control signal 156 that, when exceeded by a second voltage corresponding to the first ramp signal 148a, causes the first PWM comparator 112a to assert a logic High. In other examples, the first PWM comparator 112a can generate a logic Low (e.g., an analog voltage corresponding to a digital '0') when the second voltage is less than the first voltage.

The latches 114a-b are set in response to a rising edge of the clock signals 108a-b. The latches 114a-b are reset when the PWM comparators 112a-b assert a logic High. The latches 114a-b output a logic High from the first output (Q) and a logic Low from the second output ($\overline{Q}$) when set by the clock signals 108a-b. For example, (1) a high-side switch of the power stages 116a-b can be switched on when the first output asserts a logic High and (2) a low-side switch of the power stages 116a-b can be switched off when the first output asserts a logic Low. The latches 114a-b output a logic Low from the first output and a logic High from the second output when reset by the PWM comparators 112a-b (e.g., the PWM comparators 112a-b assert a logic High).

The current balance circuits 124a-b generate the first and second ISTEER 150a-b based on (1) the first and second VSENSE 146a-b from the current sensors 122a-b and (2) an example shared voltage (VSHARE) 162 based on an example shared current (ISHARE) 164. In FIG. 1, the third and fourth resistors 140, 142 convert ISHARE 164 into VSHARE 162. ISHARE 164 corresponds to an average current (e.g., an average output current) of all phases (e.g., the master phase and the slave phase). For example, ISHARE 164 can correspond to an average of the first ISENSE 144a and the second ISENSE 144b. Accordingly, VSHARE 162 corresponds to an average voltage (e.g., an average output voltage) of all phases. For example, VSHARE 162 can correspond to an average of a first voltage across the first inductor 118a and a second voltage across the second inductor 118b.

In some examples, the current balance circuits 124a-b can be implemented using hardware logic, machine readable instructions, hardware implemented state machines, etc., and/or a combination thereof. For example, the current balance circuits 124a-b can be implemented by one or more analog or digital circuit(s), logic circuits, programmable processor(s), programmable controller(s), GPU(s), DSP(s), ASIC(s), PLD(s), and/or FPLD(s). In other examples, the current balance circuits 124a-b can be implemented using a transconductance amplifier (i.e., a GM amplifier).

The emulated ramp generators 110a-b determine a rate at which the PWM comparators 112a-b reset the latches 114a-b by adjusting an upslope of the ramp signals 148a-b. The emulated ramp generators 110a-b determine the upslope adjustment (e.g., increasing the upslope, decreasing the upslope, etc.) based on the ISTEER 150a-b generated by the current balance circuits 124a-b. For example, the current balance circuits 124a-b balance the output currents of the master phase and the slave phase by measuring ISENSE 144a-b, converting ISENSE 144a-b into VSENSE 146a-b, comparing VSENSE 146a-b to VSHARE 162, and generating the ISTEER 150a-b based on the comparison.

Each of the current balance circuits 124a-b can generate a different quantity of a corresponding one of ISTEER 150a-b. For example, when the first VSENSE 146a is greater than VSHARE 162, the first ISENSE 144a is greater than the second ISENSE 144b. In such examples, the first current balance circuit 124a can generate a first quantity of the first ISTEER 150a that is less than a second quantity of the second ISTEER 150b generated by the second current balance circuit 124b. Accordingly, the first ISTEER 150a having the first quantity can invoke the first emulated ramp generator 110a to increase the upslope of the first ramp signal 148a to decrease a first duty cycle of the first power stage 116a. The second ISTEER 150b having the second quantity can invoke the second emulated ramp generator 110b to decrease the upslope of the second ramp signal 148b to increase a second duty cycle of the second power stage 116b. Advantageously, by decreasing the first duty cycle while increasing the second duty cycle, the first and second ISENSE 144a-b can become balanced and/or otherwise substantially equivalent (e.g., the first and second ISENSE 144a-b being within a specified tolerance (e.g., 1 nano-Amp (nA), 1 micro-Amp (uA), etc. of each other)) over time.

While an example manner of implementing the power converters 102, 104 is illustrated in FIG. 1, one or more of the elements, processes, and/or devices illustrated in FIG. 1 may be combined, divided, re-arranged, omitted, eliminated, and/or implemented in any other way. Further, the example emulated ramp generators 110a-b, the example PWM comparators 112a-b, the example latches 114a-b, the example power stages 116a-b, the example inductors 118a-b, the example capacitors 120a-b, the example current sensors 122a-b, the example current balance circuits 124a-b, the example resistors 140, 142, the example controller 154, and/or, more generally, the example power converters 102, 104 of FIG. 1 may be implemented by hardware, software, firmware, and/or any combination of hardware, software, and/or firmware. Thus, for example, any of the example emulated ramp generators 110a-b, the example PWM comparators 112a-b, the example latches 114a-b, the example power stages 116a-b, the example inductors 118a-b, the example capacitors 120a-b, the example current sensors 122a-b, the example current balance circuits 124a-b, the example resistors 140, 142, the example controller 154, and/or, more generally, the example power converters 102, 104 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example emulated ramp generators 110a-b, the example PWM comparators 112a-b, the example latches 114a-b, the example power stages 116a-b, the example inductors 118a-b, the example capacitors 120a-b, the example current sensors 122a-b, the example current balance circuits 124a-b, the example resistors 140, 142, and/or the example controller 154 is/are hereby expressly defined to include a non-transitory computer readable storage device or storage disk such as non-volatile memory (e.g., read-only memory (ROM), electrically erasable programmable read-only memory (EEPROM), flash memory, etc.), volatile memory (e.g., Synchronous Dynamic Random Access Memory (SDRAM), Dynamic Random Access Memory (DRAM), etc., and/or any other type of random access memory (RAM) device), etc., including the software and/or firmware. Further still, the example power converters 102, 104 of FIG. 1 may include one or more elements, processes, and/or devices in addition to, or instead of, those illustrated in FIG. 1, and/or may include more than one of any or all of the illustrated elements, processes, and devices.

Figure 2:
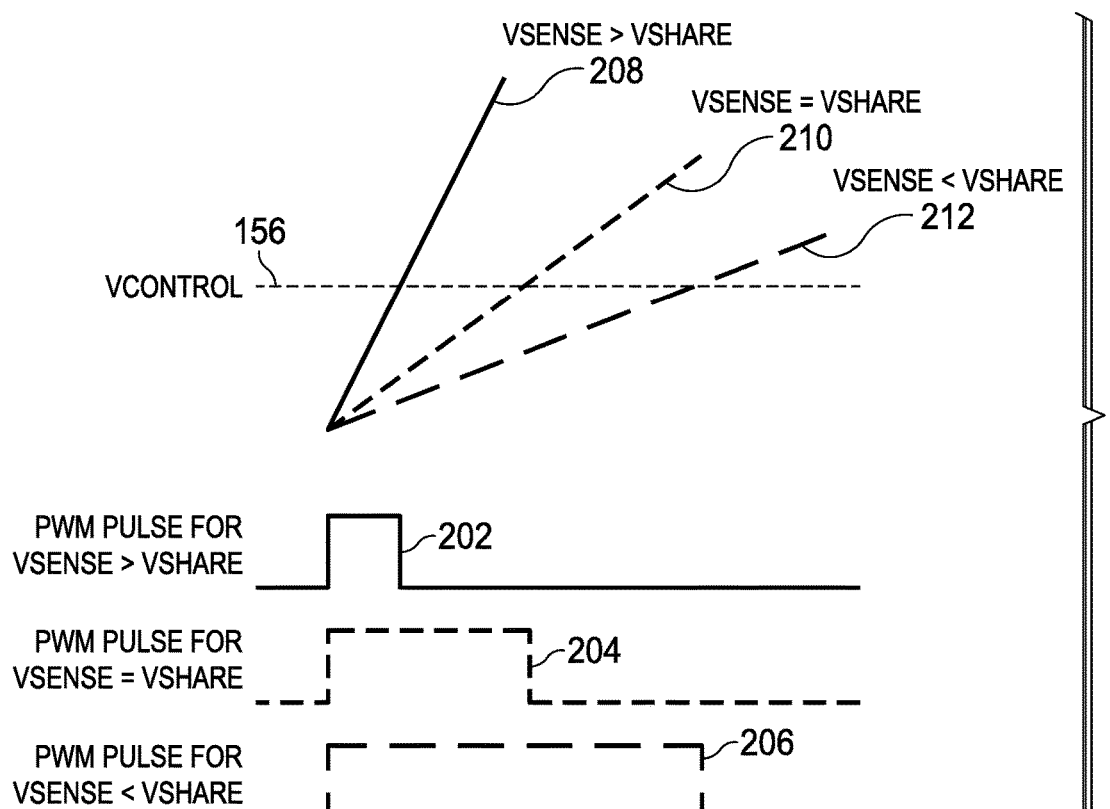
FIG. 2 depicts various example pulse-width-modulation pulses based on different example ramp voltages generated by the example emulated ramp generator of FIG. 1.

FIG. 2 depicts example PWM pulses 202, 204, 206 based on example ramp waveforms 208, 210, 212 generated by the emulated ramp generators 110a-b of FIG. 1. For example, the PWM pulses 202, 204, 206 can correspond to the first PWM signal 152a and/or the second PWM signal 152b of FIG. 1. The ramp waveforms 208, 210, 212 of FIG. 2 can correspond to the first ramp signal 148a and/or the second ramp signal 148b of FIG. 1.

In the illustrated example of FIG. 2, the control signal 156 of FIG. 1 is depicted in association with the ramp waveforms 208, 210, 212. The ramp waveforms 208, 210, 212 of FIG. 2 include a first example ramp waveform 208, a second example ramp waveform 210, and a third example ramp waveform 212. The first ramp waveform 208 corresponds to a first example where a sense voltage (e.g., the first VSENSE 146a or the second VSENSE 146b) is greater than VSHARE 162 of FIG. 1. The second ramp waveform 210 corresponds to a second example where a sense voltage is equal to and/or otherwise substantially equivalent to VSHARE 162. The third ramp waveform 212 corresponds to a third example where a sense voltage is less than VSHARE 162. In FIG. 2, the first ramp waveform 208 has a greater slope (e.g., a greater upslope) than the second ramp waveform 210. In FIG. 2, the second ramp waveform 210 has a greater slope than the third ramp waveform 212.

In the illustrated example of FIG. 2, the first PWM pulse 202 has a shorter pulse width than the second PWM pulse 204. In FIG. 2, the second PWM pulse 204 has a shorter pulse width than the third PWM pulse 206. In FIG. 2, the first PWM pulse 202 corresponds to the first ramp waveform 208, the second PWM pulse 204 corresponds to the second ramp waveform 210, and the third PWM pulse 206 corresponds to the third ramp waveform 212.

In the illustrated example of FIG. 2, the first PWM pulse 202 has the shortest pulse width of the PWM pulses 202, 204, 206 and, thus, corresponds to the first ramp waveform 208 having the steepest upslope (e.g., greatest upslope) of the ramp waveforms 208, 210, 212. For example, as the upslope of the first ramp signal 148a increases in slope (i.e., becomes steeper), the quicker the voltage of the first ramp signal 148a becomes greater than the control signal 156 and causes the first PWM comparator 112a of FIG. 1 to assert a logic High to reset the first latch 114a of FIG. 1 and, thus, produce a falling edge of the first PWM signal 152a. In other examples, as the upslope of the first ramp signal 148a decreases in slope (i.e., becomes flatter, less steep, etc.), the slower the voltage of the first ramp signal 148a becomes greater than the control signal 156 and causes the first PWM comparator 112a of FIG. 1 to assert a logic High to reset the first latch 114a to produce the falling edge of the first PWM signal 152a.

Figure 3:
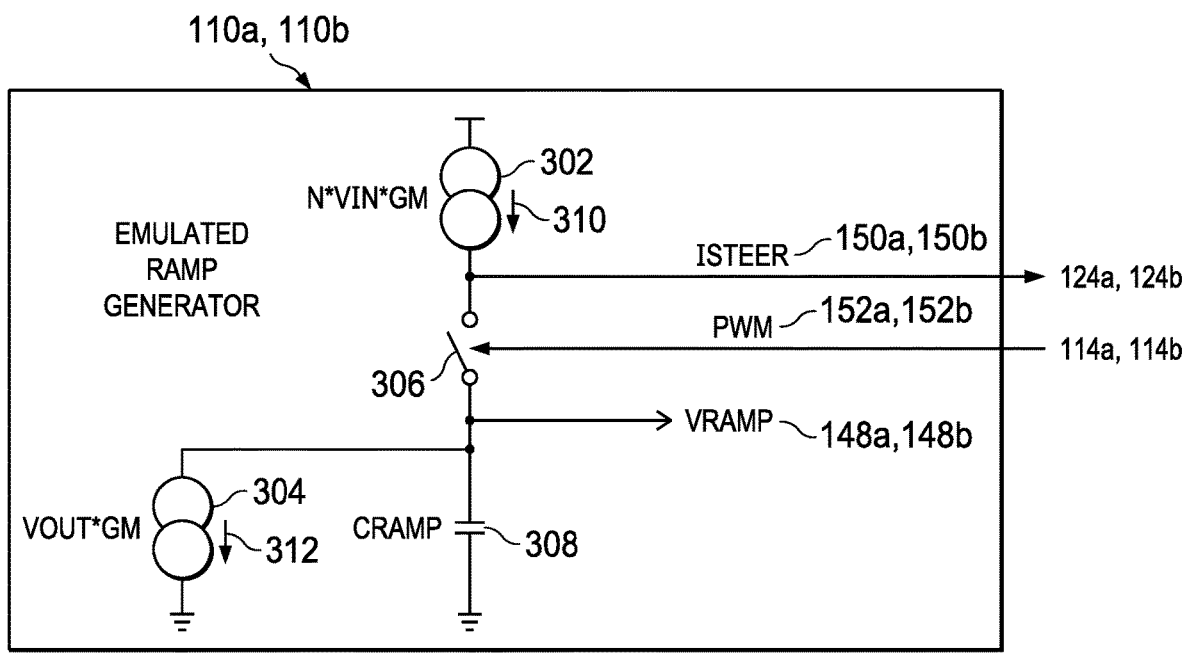
FIG. 3 is a schematic illustration of the example emulated ramp generator of FIG. 1.

FIG. 3 is a schematic illustration of the emulated ramp generators 110a-b of FIG. 1. In FIG. 3, the emulated ramp generators 110a-b include a first example amplifier 302, a second example amplifier 304, an example switch 306, and an example capacitor (CRAMP) 308. The first and second amplifiers 302, 304 of FIG. 3 are GM amplifiers. For example, the first amplifier 302 can sample an input voltage (VIN) and convert the input voltage to a first example current 310 by multiplying an example scaling factor (N), an example GM factor (GM), and the input voltage. For example, N may have a value of 0.3, 0.5, 1, etc. Alternatively, N may be any other value. In other examples, GM may have a value of 0.1, 0.5, 0.8, etc. Alternatively, GM may be any other value. The second amplifier 304 can sample an output voltage (VOUT) and convert the output voltage to a second example current 312 by multiplying the output voltage and the GM factor.

In the illustrated example of FIG. 3, the emulated ramp generators 110a-b generate the ramp signals 148a-b by pushing a current into and pulling the current out of the capacitor 308. For example, when the switch 306 is enabled (i.e., in the on position), the first current 310 charges the capacitor 308 corresponding to a value of ((N*VIN*GM)−(VOUT*GM)). When the switch is disabled (i.e., in the off position), the second current 312 discharges the capacitor 308 corresponding to a value of VOUT*GM.

In the illustrated example of FIG. 3, when the switch 306 is enabled, a voltage of the capacitor 308 increases at a rate corresponding to ((N*VIN*GM)−(VOUT*GM)). In such examples, the voltage of the capacitor 308 can generate the ramp signals 148a-b of FIG. 1. For example, the ramp signals 148a-b have a voltage corresponding to the voltage of the capacitor 308 and, thus, increase when the voltage of the capacitor 308 increases. In other examples, when the switch 306 is disabled, the voltage of the capacitor 308 discharges at a rate corresponding to VOUT*GM. In such examples, the discharging of the capacitor 308 can cause the ramp signals 148a-b to approach and/or otherwise become zero.

Figure 4:
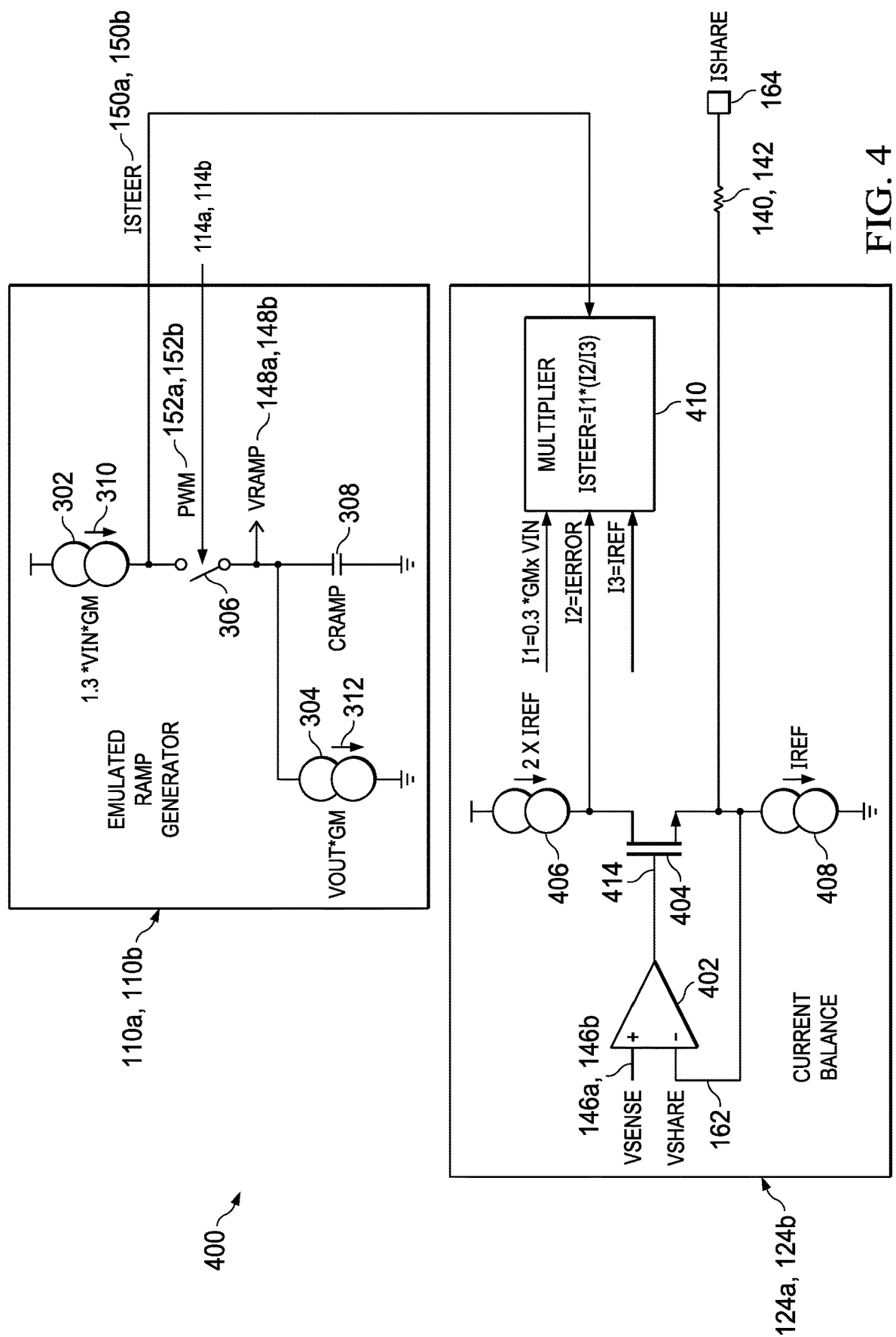
FIG. 4 is a schematic illustration of an example ramp control circuit including the example emulated ramp generator of FIGS. 1 and 3 and the example current balance circuit of FIG. 1.

FIG. 4 is a schematic illustration of an example ramp control circuit 400 to generate the ramp signals 148a-b of FIG. 1 based on the ISTEER 150a-b. In FIG. 4, the ramp control circuit 400 includes one of the emulated ramp generator 110a-b of FIG. 3 and a corresponding one of the current balance circuits 124a-b of FIG. 1. For example, the ramp control circuit 400 can be included in one or both power converters 102, 104 of FIG. 1. In such examples, the ramp control circuit 400 included in the first power converter 102 can include the first emulated ramp generator 110a and the first current balance circuit 124a. In other examples, the ramp control circuit 400 included in the second power converter 104 can include the second emulated ramp generator 110b and the second current balance circuit 124b.

In the illustrated example of FIG. 4, an offset of 30% is added to the first current 310 generated by the first amplifier 302 of the emulated ramp generator 110a-b. The 30% offset is represented by the scaling factor N having a value of 1.3 as described above in connection with FIG. 3. Alternatively, the offset may be any other value. The offset represented by the value of 1.3 for N is injected into and/or otherwise added to the first current 310 so that the charging current (e.g., the first current 310) of the capacitor 308 can be adjusted in both directions (e.g., decrease the first current 310, increase the first current 310, etc.). For example, the first current 310 can have a quantity of current of 1.3*VIN*GM.

In the illustrated example of FIG. 4, the current balance circuit 124a-b generates ISTEER 150a-b to steer a quantity of the first current 310 away from charging the capacitor 308. ISTEER 150a-b can be used to either increase or decrease the upslope of the ramp signals 148a-b. In FIG. 4, the current balance circuit 124a-b includes an example comparator 402, an example transistor 404, a first example DC source 406, a second example DC source 408, and an example multiplier (e.g., a multiplier circuit, a current multiplier circuit, etc.) 410. In FIG. 4, the comparator 402 is an operational amplifier comparator. For example, the comparator 402 can assert a signal (e.g., a current, a voltage, etc.) that is proportional to a difference between the inputs of the comparator 402. In such examples, the comparator 402 can generate a first current based on a first difference and a second current based on a second difference, where the second current and the second difference are less than the first current and the first difference, respectively.

In the illustrated example of FIG. 4, the comparator 402 compares VSENSE 146a-b and VSHARE 162 and asserts a first voltage when VSENSE 146a-b is greater than VSHARE 162 based on the comparison. In other examples, the comparator 402 can assert a second voltage less than the first voltage when VSENSE 146a-b is less than VSHARE 162 based on the comparison. The comparator 402 transmits the asserted voltage signal to an example gate 414 of the transistor 404.

In the illustrated example of FIG. 4, the transistor 404 is an N-channel MOSFET. Alternatively, the transistor 404 may be any other type of power switching device such as a BJT. In FIG. 4, the first DC source 406 produces a current having a value of 2*IREF, where IREF is a reference current. In FIG. 4, the second DC source 408 generates a current having a value of IREF.

In the illustrated example of FIG. 4, the current balance circuits 124a-b include the multiplier circuit 410 to generate ISTEER 150a-b based on a difference between VSENSE 146a-b and VSHARE 162. In FIG. 4, the multiplier circuit 410 is an IC. For example, the multiplier circuit 410 can correspond to hardware logic including one or more BJTs (e.g., NMOS BJTs), one or more MOSFETs (e.g., N-channel MOSFETs), etc. The multiplier circuit 410 generates ISTEER 150a-b based on a multiplication operation described below in Equation (1):

$$ISTEER = I1 * \left(\frac{I2}{I3}\right) \qquad \text{Equation (1)}$$

In the example of Equation (1) above, I1 corresponds to a first current having a value of 0.3*GM*VIN. In the example of Equation (1) above, I2 corresponds to a second current having a value of IERROR and I3 corresponds to a third current having a value of IREF. IERROR is a quantity of current that remains after a portion of 2*IREF from the first DC source 406 flows through the transistor 404. For example, a first portion of 2*IREF can flow through the transistor 404 based on a drain-to-source resistance of the transistor 404. In such examples, a second portion corresponding to a difference between the first portion and 2*IREF is IERROR. The second portion flows to the multiplier circuit 410 to determine ISTEER 150a-b.

In operation, VSENSE 146a-b is compared to VSHARE 162 and a difference based on the comparison is dropped across the resistor 140, 142 to generate IERROR. The first DC source 406 and the second DC source 408 are bias currents that ensure IERROR is a portion of the current 2*IREF (e.g., in a range of 0 to 2*IREF). The multiplier circuit 410 normalizes IERROR with IREF by converting IERROR into a ratio between 0 and 2. The ratio of IERROR and IREF is multiplied by 0.3*GM*VIN to generate ISTEER 150a-b, where ISTEER 150a-b can have a value in a range from 0 to 2*0.3*GM*VIN. ISTEER 150a-b can vary based on the difference between VSENSE 146a-b and VSHARE 162 until VSENSE 146a-b is equal to and/or otherwise becomes VSHARE 162.

In some examples, VSENSE 146a-b is equal to VSHARE 162. In such examples, IERROR=IREF and ISTEER= (0.3*VIN*GM). When ISTEER=(0.3*VIN*GM), then a first portion of the first current 310 that charges the capacitor 308 becomes VIN*GM while 0.3*VIN*GM is steered away to the multiplier circuit 410. Steering away a current of 0.3*VIN*GM removes the offset current added to the first amplifier 302 (e.g., the offset current corresponding to 1.3 for the scaling factor N). For example, a quantity of 0.3*GM*VIN of the first current 310 is steered away from the capacitor 308 to the multiplier circuit 410, where the current that is steered away corresponds to ISTEER 150a-b. Advantageously, the quantity of ISTEER 150a-b is a ratio (e.g., a ratio of IERROR and IREF) multiplied by 0.3*GM*VIN and, thus, the quantity of current steered away from charging the capacitor 308 is a fixed portion of the charging current VIN*GM.

In some examples, VSENSE 146a-b is greater than VSHARE 162. In such examples, IERROR<IREF and ISTEER<(0.3*VIN*GM), which causes a portion of the 30% offset to charge the capacitor 308. When the portion of the offset charges the capacitor 308, the ramp signal 148a-b is greater than VIN*GM causing the upslope of the ramp signal 148a-b to become steeper. When the upslope becomes steeper, the on-time of the corresponding power stage 116a-b of FIG. 1 is reduced and causes a reduction in the inductor current (e.g., ISENSE 144a-b of FIG. 1) of one of the phases because the inductor current is greater than the inductor current of a different one of the phases.

In some examples, VSENSE 146a-b is less than VSHARE 162. In such examples, IERROR>IREF and ISTEER>(0.3*VIN*GM), which causes a quantity of the first current 310 greater than the 30% offset to be removed from the charging of the capacitor 308. When the quantity of the first current 310 is greater than the 30% offset, the ramp signal 148a-b is less than VIN*GM causing the upslope of the ramp signal 148a-b to become shallower (i.e., less steep). When the upslope becomes shallower, the on-time of the corresponding power stage 116a-b is increased and causes an increase in the inductor current (e.g., ISENSE 144a-b of FIG. 1) of one of the phases because the inductor current is less than the inductor current of a different one of the phases.

Advantageously, the ramp control circuit 400 ensures that for any VIN*GM current charging the capacitor 308 to produce the ramp signal 148a-b, the quantity of ISTEER 150a-b is proportional to (VIN*GM)*(IERROR/IREF). IERROR is determined based on a difference between VSENSE 146a-b and VSHARE 162 and the difference is normalized by IREF. The quantity of ISTEER 150a-b becomes a fixed portion of the charging current of the capacitor 308 (e.g., VIN*GM). Accordingly, a portion adjustment (e.g., a percentage adjustment) of a duty cycle of a corresponding one of the power stages 116a-b for any difference between VSENSE 146a-b and VSHARE 162 becomes the same for any duty cycle.

Figure 5A:
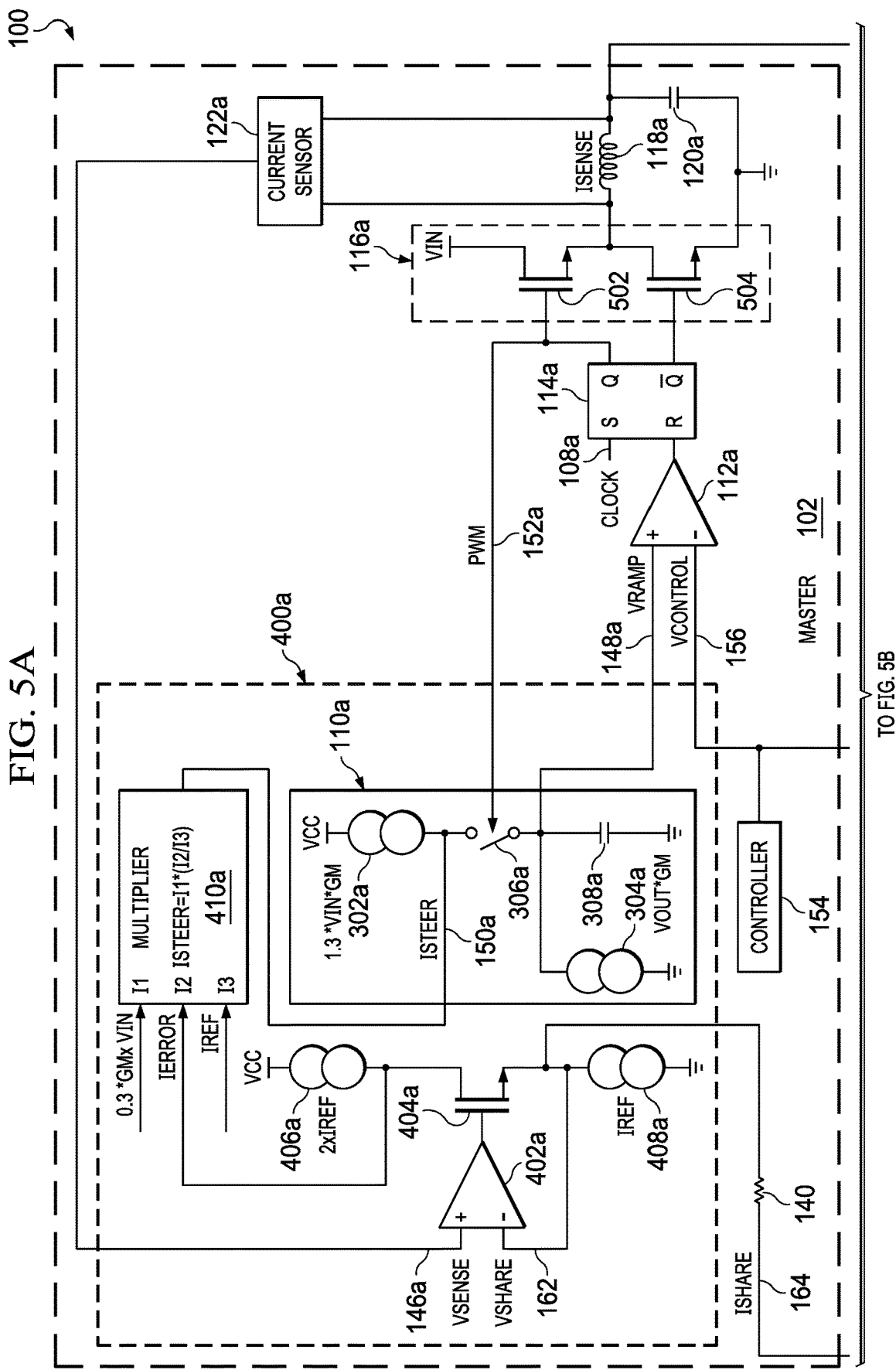
FIGS. 5A-5B depict a schematic illustration of the first example power conversion system of FIG. 1 including the example ramp control circuit of FIG. 4.
Figure 5B:
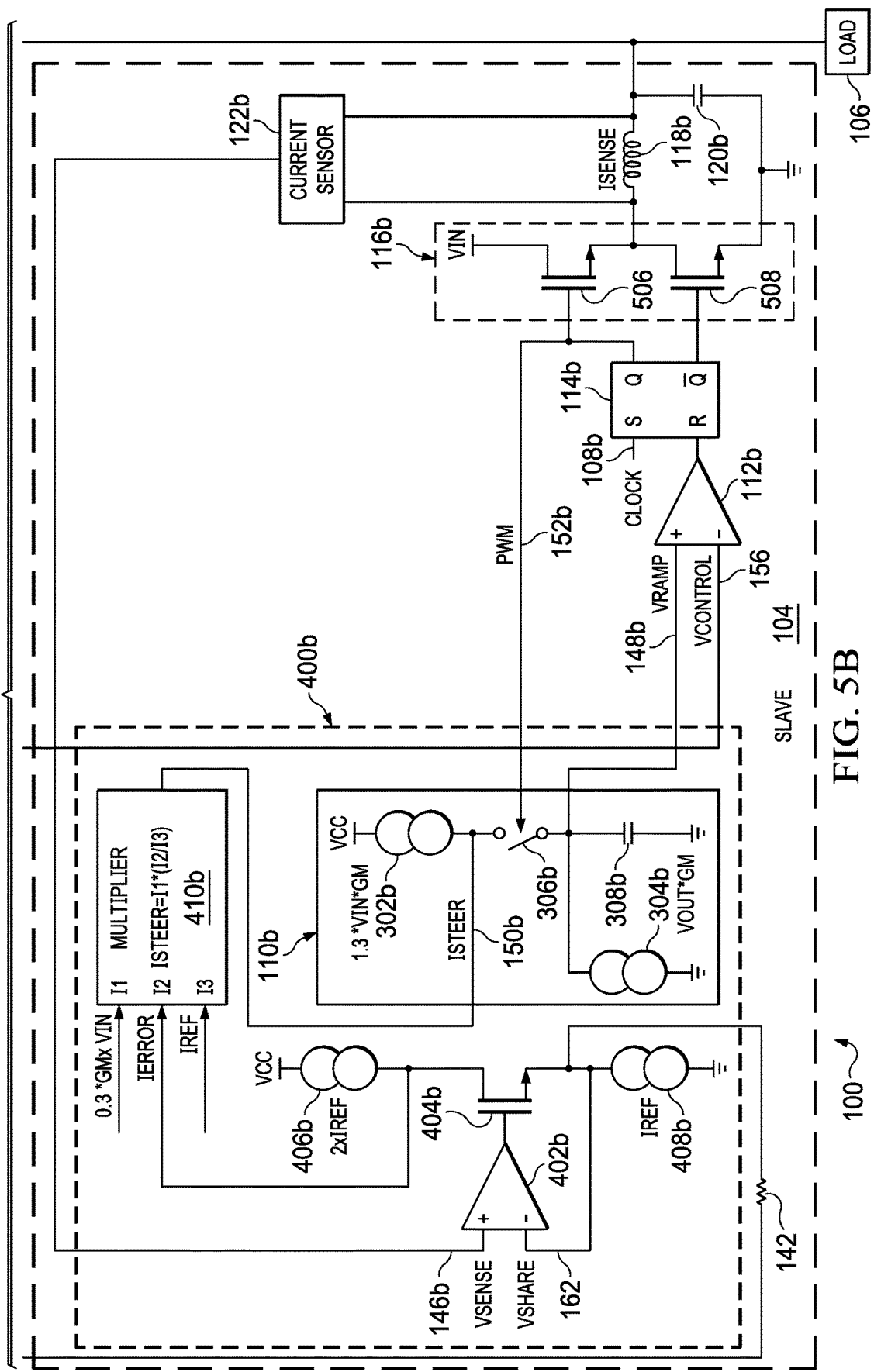

FIGS. 5A-5B depict a schematic illustration of the first power conversion system 100 of FIG. 1 including the ramp control circuit 400 of FIG. 4. In FIG. 5A, the first power converter 102 includes a first example ramp control circuit 400a corresponding to the ramp control circuit 400 of FIG. 4. In FIG. 5B, the second power converter 104 includes a second example ramp control circuit 400b corresponding to the ramp control circuit 400 of FIG. 4.

In the illustrated example of FIGS. 5A-5B, the first power converter 102 and the second power converter 104 of the first power conversion system 100 are each configured in a buck configuration. For example, the first power converter 102 includes the first power stage 116a coupled to an output LC filter (e.g., the first inductor 118a coupled in series to the first capacitor 120a). Alternatively, the first power converter 102 and/or the second power converter 104 may be configured in a different configuration (e.g., a boost configuration, a buck-boost configuration, etc.).

The first power stage 116a of the illustrated example of FIG. 5A includes a first example transistor 502 coupled to a second example transistor 504. The second power stage 116b of the illustrated example of FIG. 5B includes a third example transistor 506 coupled to a fourth example transistor 508. The first through fourth transistors 502, 504 506, 508 are N-channel MOSFETs. Alternatively, one or more of the first through fourth transistors 502, 504, 506, 508 may be a different power switching device (e.g., a BJT, an insulated gate bipolar transistor (IGBT), a field-effect transistor (FET), etc.). The first and third transistors 502, 506 are high-side (HS) transistors. The second and fourth transistors 504, 508 are low-side (LS) transistors.

In the illustrated example of FIGS. 5A-5B, the first output (Q) of a respective one of the latches 114a-b is coupled to a gate terminal of a respective one of the HS transistors 502, 506. The second output ($\overline{Q}$) of a respective one of the latches 114a-b is coupled to a gate terminal of a respective one of the LS transistors 504, 508. A source terminal (e.g., a current terminal, a source, etc.) of a respective one of the HS transistors 502, 506 is coupled to (1) a drain terminal (e.g., a current terminal, a drain, etc.) of a respective one of the LS transistors 504, 508 and (2) the first end of a respective one of the inductors 118a-b.

In operation, the first power conversion system 100 regulates an output current (e.g., ISENSE 144a-b) of a respective one of the power converters 102, 104 by (1) sensing and/or otherwise measuring the output current of each phase (e.g., the first ISENSE 144a of the master phase and the second ISENSE 144b of the slave phase), (2) converting the output currents to a sense voltage (e.g., converting the first ISENSE 144a to the first VSENSE 146a and converting the second ISENSE 144b to the second VSENSE 146b), and (3) comparing the sense voltage to an average or shared voltage (e.g., VSHARE 162) that corresponds to an average or shared current (e.g., ISHARE 164). Based on the comparison, the ramp control circuits 400a-b adjust an upslope of the ramp signals 148a-b by determining a quantity of ISTEER 150a-b to steer away from charging the capacitors 308a-b and, thus, adjust a duty cycle of the power stages 116a-b in response to adjusting the upslope of the ramp signals 148a-b.

In some examples, the first VSENSE 146a is greater than VSHARE 162 and the second VSENSE 146b is less than VSHARE 162. In such examples, the first ISENSE 144a is greater than the second ISENSE 144b. Accordingly, the first power converter 102 is generating a greater portion of the power provided to the load 106 of FIG. 1 because the duty cycle of the first power stage 116a is greater than the duty cycle of the second power stage 116b based on the first ISENSE 144a being greater than the second ISENSE 144b.

To reduce the difference in the ISENSE 144a-b of the first power conversion system 100, the ramp control circuits 400a-b generate a first value for the first ISTEER 150a and a second value for the second ISTEER 150b. To generate the first value for the first ISTEER 150a, the comparator 402a of the first ramp control circuit 400a increases a turn-on strength of the transistor 404a to decrease IERROR being transmitted to the multiplier circuit 410a by directing an increased portion of the current from the first DC source 406a through the transistor 404a and the third resistor 140. The multiplier circuit 410a of the first ramp control circuit 400a generates the first value for the first ISTEER 150a by using the example of Equation (1) above.

In some examples, when IERROR of the first ramp control circuit 400a is reduced, the first ISTEER 150a has a value less than 0.3*GM*VIN corresponding to I1 being transmitted to the multiplier circuit 410a. When the first ISTEER 150a has a value less than 0.3*GM*VIN, a charging current of the first emulated ramp generator 110a has a value greater than GM*VIN and, thus, increases the upslope of the first ramp signal 148a. By increasing the upslope, the first PWM comparator 112a asserts a logic High faster when compared to a previous value of the upslope of the first ramp signal 148a. By asserting the logic High quicker, the first latch 114a resets quicker to reduce an on-time of the first transistor 502 and, thus, to decrease a duty cycle of the first power stage 116a. By reducing the on-time of the first transistor 502, the quantity of the first ISENSE 144a is reduced.

To generate the second value for the second ISTEER 150b, the comparator 402b of the second ramp control circuit 400b decreases a turn-on strength off the transistor 404b to increase IERROR being transmitted to the multiplier circuit 410b by reducing a quantity of the current from the first DC source 406b flowing through the transistor 404b and the fourth resistor 142. The multiplier circuit 410b of the second ramp control circuit 400b generates the second value for the second ISTEER 150b by using the example of Equation (1) above.

In some examples, when IERROR of the second ramp control circuit 400b is increased, the second ISTEER 150b has a value greater than 0.3*GM*VIN corresponding to I1 being transmitted to the multiplier circuit 410b. When the second ISTEER 150b has a value greater than 0.3*GM*VIN, a charging current of the second emulated ramp generator 110b has a value less than GM*VIN and, thus, decreases the upslope of the second ramp signal 148b. By decreasing the upslope, the second PWM comparator 112b asserts a logic High slower when compared to a previous value of the upslope of the second ramp signal 148b. By asserting the logic High slower, the second latch 114b resets slower to extend an on-time of the third transistor 506 and, thus, to increase a duty cycle of the second power stage 116b.

By shortening the on-time of the first transistor 502 and extending the on-time of the third transistor 506, the quantity of the first ISENSE 144a is decreased while the quantity of the second ISENSE 144b is increased. As the upslope of the ramp signals 148a-b are adjusted, the duty cycles of the power stages 116a-b are adjusted until the ISENSE 144a-b equals and/or otherwise substantially approach ISHARE 164. For example, the ramp control circuits 400a-b may not perform adjustments of the upslopes of the ramp signals 148a-b when the ISENSE 144a-b equal ISHARE 164. In such examples, the ramp control circuits 400a-b can resume performing adjustments of the upslopes of the ramp signals 148a-b when the ISENSE 144a-b diverge and/or otherwise become different from ISHARE 164. Advantageously, by decreasing the first ISENSE 144a while the second ISENSE 144b is increasing, the ramp control circuits 400a-b of the first power conversion system 100 reduce the difference between and/or otherwise balance quantities of the ISENSE 144a-b to improve power delivery to the load 106 of FIG. 1.

FIGS. 6-7 depict example timing diagrams 600, 700 corresponding to operation of the first power conversion system 100 of FIGS. 1 and 5. In the timing diagram 600 of FIG. 6, example values are depicted for associated waveforms at a second example time $(T_2)$ 620. In the timing diagram 700 of FIG. 7, example values are depicted for the associated waveforms at a fourth example time $(T_4)$ 624.

Depicted in the timing diagrams 600, 700 of FIGS. 6-7 are example waveforms for the first VSENSE 146a (VSENSE_MASTER), the second VSENSE 146b (VSENSE_SLAVE), VSHARE 162, the first ISTEER 150a (ISTEER_MASTER), the second ISTEER 150b (ISTEER_SLAVE), the first ramp signal 148a (IVINGM_MASTER), and the second ramp signal 148b (IVINGM_SLAVE) of FIG. 1. Further depicted are example waveforms for an example master resistor current 602 (IRESISTOR_MASTER), an example slave resistor current 604 (IRESISTOR_SLAVE), an example master I1 current 606, an example master I2 current 608, an example master I3 current 610, an example slave I1 current 612, an example slave I2 current 614, and an example slave I3 current 616.

In the illustrated example of FIG. 6, the master resistor current 602 is a waveform that corresponds to a current flowing through the third resistor 140 of FIG. 1. The slave resistor current 604 is a waveform that corresponds to a current flowing through the fourth resistor 142 of FIG. 1. The master I1 current 606 is a waveform corresponding to I1 (0.3*GM*VIN) associated with the multiplier circuit 410a of the first ramp control circuit 400a of FIG. 5A. The master I2 current 608 is a waveform corresponding to I2 (IERROR) associated with the multiplier circuit 410a of the first ramp control circuit 400a. The master I3 current 610 is a waveform corresponding to I3 (IREF) associated with the multiplier circuit 410a of the first ramp control circuit 400a. The slave I1 current 612 is a waveform corresponding to I1 (0.3*GM*VIN) associated with the multiplier circuit 410b of the second ramp control circuit 400b of FIG. 5B. The slave I2 current 614 is a waveform corresponding to I2 (IERROR) associated with the multiplier circuit 410b of the second ramp control circuit 400b. The slave I3 current 616 is a waveform corresponding to I3 (IREF) associated with the multiplier circuit 410b of the second ramp control circuit 400b.

In the first timing diagram 600 of FIG. 6, at a first example time $(T_1)$ 618, the first power converter 102 is generating a greater output current than the second power converter 104 of the first power conversion system 100 of FIGS. 1 and 5 because the first VSENSE 146a is greater than VSHARE

162. At the first time 618, the master resistor current 602 is greater than the slave resistor current 604 because the first ramp control circuit 400a of FIG. 5A is sourcing current through the third resistor 140 causing the second ramp control circuit 400b of FIG. 5B to sink the current. Because the first and second ramp control circuits 400a-b are connected through the ISHARE 164 line of FIGS. 5A-5B, the values of the master and slave resistor currents 602, 604 are equal in magnitude and opposite in polarity. Further, the respective values for the first and second ISTEER 150a-b are equal in magnitude and opposite in polarity. Moreover, the respective values for the first and second ramp signals 148a-b are equal in magnitude and opposite in polarity.

In the timing diagram 600 of FIG. 6, at the second time 620, the first VSENSE 146a is greater than VSHARE 162 and corresponds to the first power converter 102 outputting more current than the second power converter 104, which is indicative of the phase currents being unbalanced and/or otherwise different. At the second time 620, the master I2 current 608 has an increased value when compared to the master I2 current 608 at the first time 618 because the first VSENSE 146a is greater than VSHARE 162 and, thus, causes the first ramp control circuit 400a to source current through the third resistor 140. The first ramp control circuit 400a is sourcing current based on the master resistor current 602 having a positive value at the second time 620.

Because of the increase of the master I2 current 608, the multiplier circuit 410a of the first ramp control circuit 400a generates a reduced value of the first ISTEER 150a when compared to the first ISTEER 150a at the first time 618. As a result of the reduced value of the first ISTEER 150a, an increased quantity of current is used to charge the capacitor 308a of the first emulated ramp generator 110a. At the second time 620, the first ramp signal 148a has an increased value based on the increased quantity of current used to charge the capacitor 308a. By increasing the first ramp signal 148a, an on-time of the first power stage 116a decreases and, thus, decreases the duty cycle of the first power stage 116a. By decreasing the duty cycle of the first power stage 116a, a reduced quantity of the first ISENSE 144a flows through the first inductor 118a.

In the timing diagram 600 of FIG. 6, at the second time 620, the slave I2 current 614 has a decreased value when compared to the slave I2 current 614 at the first time 618 because the second VSENSE 146b is less than VSHARE 162 and, thus, causes the second ramp control circuit 400b to sink current through the fourth resistor 142. The second ramp control circuit 400b is sinking current based on the slave resistor current 604 having a negative value at the second time 620. Because of the decrease of the slave I2 current 614, the multiplier circuit 410b of the second ramp control circuit 400b generates an increased value of the second ISTEER 150b when compared to the second ISTEER 150b at the first time 618. As a result of the increased value of the second ISTEER 150b, a decreased quantity of current is used to charge the capacitor 308b of the second emulated ramp generator 110b. At the second time 620, the second ramp signal 148b has a decreased value based on the decreased quantity of current used to charge the capacitor 308b. By decreasing the second ramp signal 148b, an on-time of the second power stage 116b increases and, thus, increases the duty cycle of the second power stage 116b. By increasing the duty cycle of the second power stage 116b, an increased quantity of the second ISENSE 144b flows through the second inductor 118b.

In the timing diagram 600 of FIG. 6, at a third example time $(T_3)$ 622, the first VSENSE 146a is approximately equal to the second VSENSE 146b and VSHARE 162 and corresponds to the first power converter 102 outputting the same quantity of current as the second power converter 104, which is indicative of the phase currents being balanced. In the timing diagram 600 of FIG. 6, at the fourth time 624, the first VSENSE 146a is less than VSHARE 162 and corresponds to the first power converter 102 outputting less current than the second power converter 104, which is indicative of the phase currents being unbalanced and/or otherwise different.

At the fourth time 624, the second ramp control circuit 400b is sourcing current through the fourth resistor 142 based on the slave resistor current 604 having a positive value. At the fourth time 624, the first ramp signal 148a is greater than the second ramp signal 148b because on-time and, correspondingly, the duty cycle of the second power stage 116b is greater than the on-time and, correspondingly, the duty cycle of the first power stage 116a. In some examples, after the fourth time 624, the ramp control circuits 400a-b balance the difference in output currents by causing the master I2 current 608 to decrease and the slave I2 current 614 to increase to cause adjustments in the ramp signals 148a-b to affect a proximate duty cycle.

Figure 8:
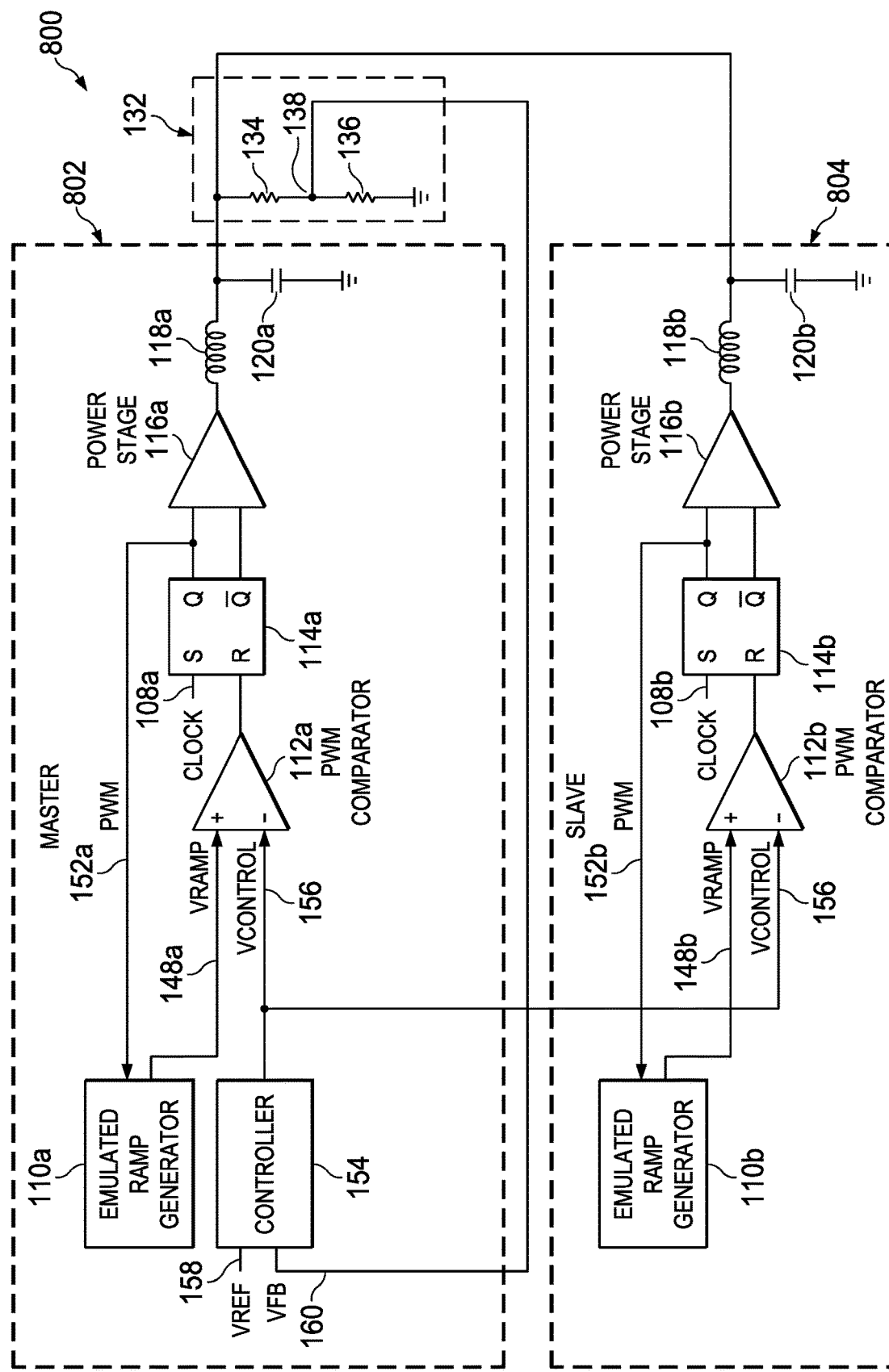
FIG. 8 is a schematic illustration of a second example power conversion system including the example emulated ramp generator of FIG. 1.

FIG. 8 is a schematic illustration of a second example power conversion system 800 including the emulated ramp generators 110a-b of FIGS. 1 and 3. The second power conversion system 800 includes a third example power converter 802 and a fourth example power converter 804. The third and fourth power converters 802, 804 are configured in a buck configuration. Alternatively, the third and/or fourth power converters 802, 804 may be configured in a boost configuration, a buck-boost configuration, etc.

In the illustrated example of FIG. 8, the third power converter 802 includes the first emulated ramp generator 110a, the controller 154, the first PWM comparator 112a, the first latch 114a, the first power stage 116a, the first inductor 118a, and the first capacitor 120a of FIG. 1. In FIG. 8, the voltage divider 132 of FIG. 1 is coupled to the third and fourth power converters 802, 804. Alternatively, the voltage divider 132 may not be coupled to the third and/or fourth power converters 802, 804. In FIG. 8, the fourth power converter 804 includes the second emulated ramp generator 110b, the second PWM comparator 112b, the second latch 114b, the second power stage 116b, the second inductor 118b, and the second capacitor 120b of FIG. 1.

In operation, the controller 154 obtains VFB 160 from the voltage divider 132 at the feedback measurement node 138 and generates the control signal 156 based on a comparison of VREF 158 and VFB 160 of FIG. 1. The control signal 156 is transmitted to the inverting input of the PWM comparators 112a-b. The PWM comparators 112a-b compare the control signal 156 to a respective one of the ramp signals 148a-b to maintain the output currents of the master and slave phases in regulation by controlling the duty cycles of the power stages 116a-b. Because of mismatches between the master and slave phases due to process variations in the components, the LC filters (e.g., the inductors 118a-b and the capacitors 120a-b), etc., the duty cycle that is generated between the master and the slave phases are different. Accordingly, the DC outputs from each phase are different that results in one of the phases providing more current or less current than the other phase.

Advantageously, the first power conversion system 100 of FIGS. 1 and 5 include the emulated ramp generators 110a-b and the current balance circuits 124a-b to adjust and/or otherwise control the ramp signals 148a-b at the non-inverting input of the PWM comparators 112a-b to prevent hitting a current limit or thermal shutdown due to a difference in phase current outputs. Advantageously, the first power conversion system 100 improves the second power conversion system 800 by balancing and/or otherwise attempting to equate the currents of each phase to control the duty cycles of the power stages 116a-b to produce substantially equivalent current outputs by adjusting the ramp signals 148a-b at the non-inverting inputs of the PWM comparators 112a-b.

Figure 9:
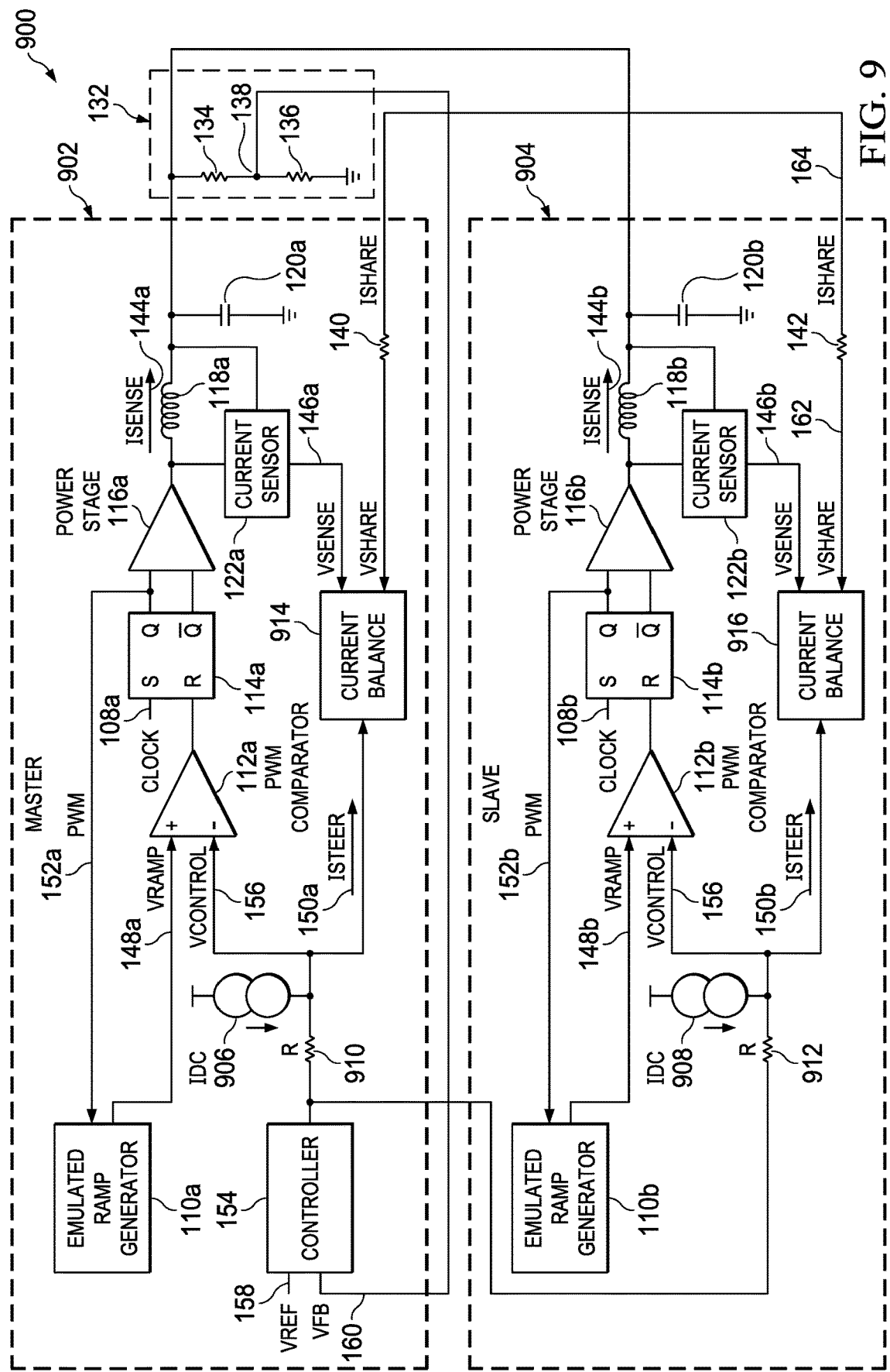
FIG. 9 is a schematic illustration of a third example power conversion system including the example emulated ramp generator of FIG. 1 and a second example current balance circuit.

FIG. 9 is a schematic illustration of a third example power conversion system 900 including the emulated ramp generators 110a-b of FIGS. 1 and 3. The third power conversion system 900 includes a fifth example power converter 902 and a sixth example power converter 904. The fifth and sixth power converters 902, 904 are configured in a buck configuration. Alternatively, the fifth and/or sixth power converters 902, 904 may be configured in a boost configuration, a buck-boost configuration, etc.

In the illustrated example of FIG. 9, the fifth power converter 902 includes the first emulated ramp generator 110a, the controller 154, the first PWM comparator 112a, the first latch 114a, the first power stage 116a, the first inductor 118a, the first capacitor 120a, the third resistor 140, and the first current sensor 122a of FIG. 1. In FIG. 9, the voltage divider 132 of FIG. 1 is coupled to the fifth and sixth power converters 902, 904. Alternatively, the voltage divider 132 may not be coupled to the fifth and/or sixth power converters 902, 904. In FIG. 9, the sixth power converter 904 includes the second emulated ramp generator 110b, the second PWM comparator 112b, the second latch 114b, the second power stage 116b, the second inductor 118b, the second capacitor 120b, the fourth resistor 142, and the second current sensor 122b of FIG. 1.

In the illustrated example of FIG. 9, the fifth power converter 902 includes a third example DC source 906 to inject a current to provide an offset so that the on-time of the first power stage 116a can be adjusted in both directions. A third example current balance circuit 914 steers the first ISTEER 150a through a fifth example resistor 910 based on a difference between the first VSENSE 146a and VSHARE 162. The sixth power converter 904 includes a fourth example DC source 908 to inject a current to provide an offset so that the on-time of the second power stage 116b can be adjusted in both directions. A fourth example current balance circuit 916 steers the second ISTEER 150b through a sixth example resistor 912 based on a difference between the second VSENSE 146b and VSHARE 162.

In operation, the controller 154 obtains VFB 160 from the voltage divider 132 and generates the control signal 156 based on a comparison of VREF 158 and VFB 160 of FIG. 1. The control signal 156 is transmitted to the inverting input of the PWM comparators 112a-b. The current balance circuits 914, 916 steers the ISTEER 150a-b away from the inverting inputs of the PWM comparators 112a-b based on respective differences between the VSENSE 146a-b and VSHARE 162. When the ISTEER 150a-b are steered away from the inverting inputs, a quantity of current transmitted to the inverting inputs decreases and, thus, causes an adjustment of the on-time of the respective power stages 116a-b. Accordingly, the PWM comparators 112a-b compare the adjusted control signal 156 to a respective one of the ramp signals 148a-b to maintain the output currents of the master and slave phases in regulation by controlling the duty cycles of the power stages 116a-b.

Because the on-time adjustment is determined based on the difference between VSENSE 146a-b and VSHARE 162, the on-time adjustment from the current balance circuits 914, 916 become a larger portion of the on-time when the on-time of the respective power converter 902, 904 is initially small. When the on-time adjustment becomes a larger portion of the on-time of the power stages 116a-b, the current balance circuits 914, 916 become increasingly sensitive to adjustments and may cause ramp control and/or current balance instability as the on-time of the fifth and sixth power converters 902, 904 diminish. Advantageously, the first power conversion system 100 of FIGS. 1 and 5 improves the third power conversion system 900 by adjusting the non-inverting input of the PWM comparators 112a-b compared to adjusting the inverting input of the PWM comparators 112a-b as depicted in FIG. 9. By adjusting the non-inverting input, the first power conversion system 100 can adjust the upslope and downslope of the ramp signals 148a-b to correspond with the upslope and the downslope of the inductor currents (e.g., ISENSE 144a-b).

Figure 10A:
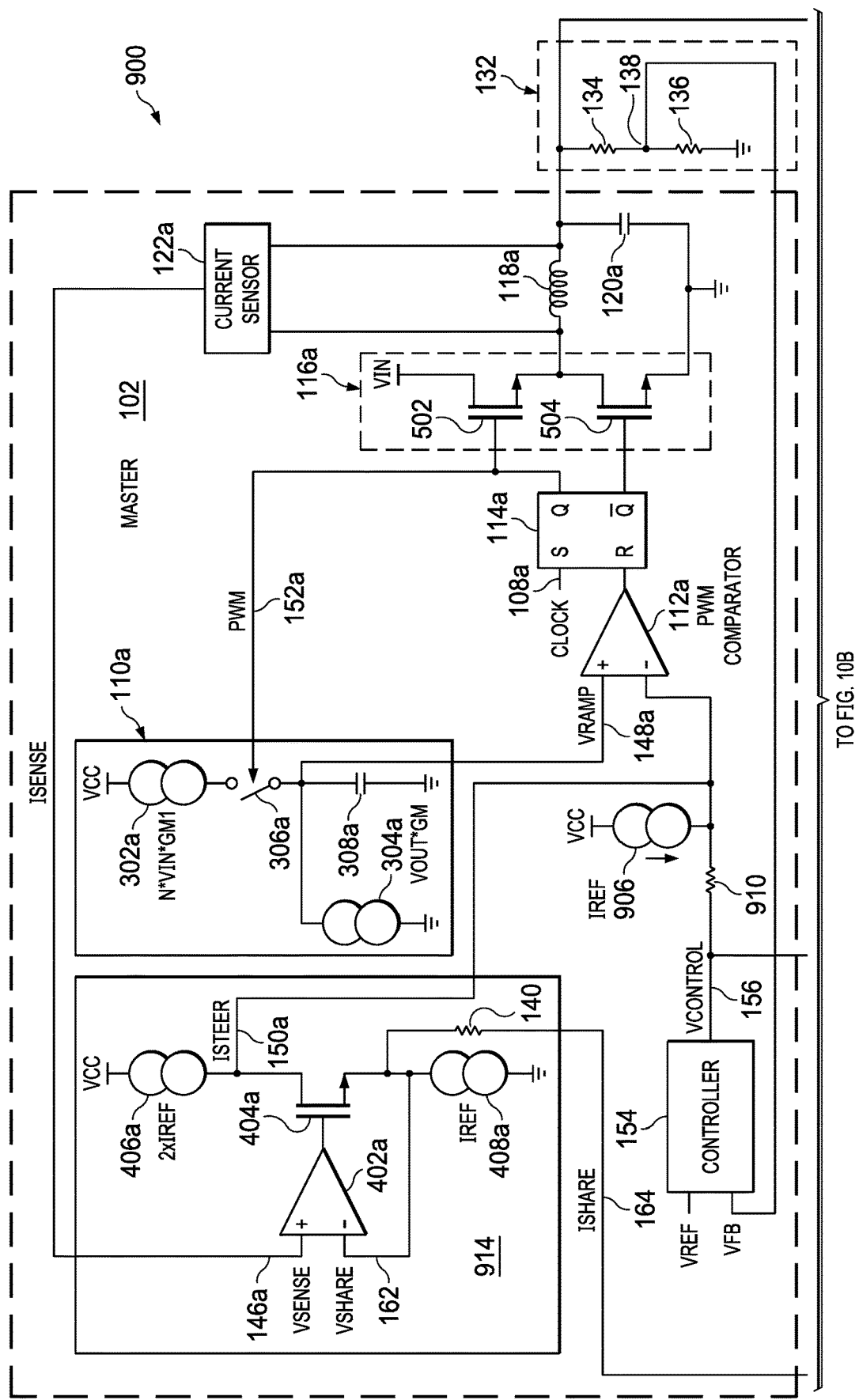
FIGS. 10A-10B depict a schematic illustration of the third example power conversion system of FIG. 9 including the example emulated ramp generator of FIGS. 1 and 3 and the second example current balance circuit of FIG. 9.
Figure 10B:
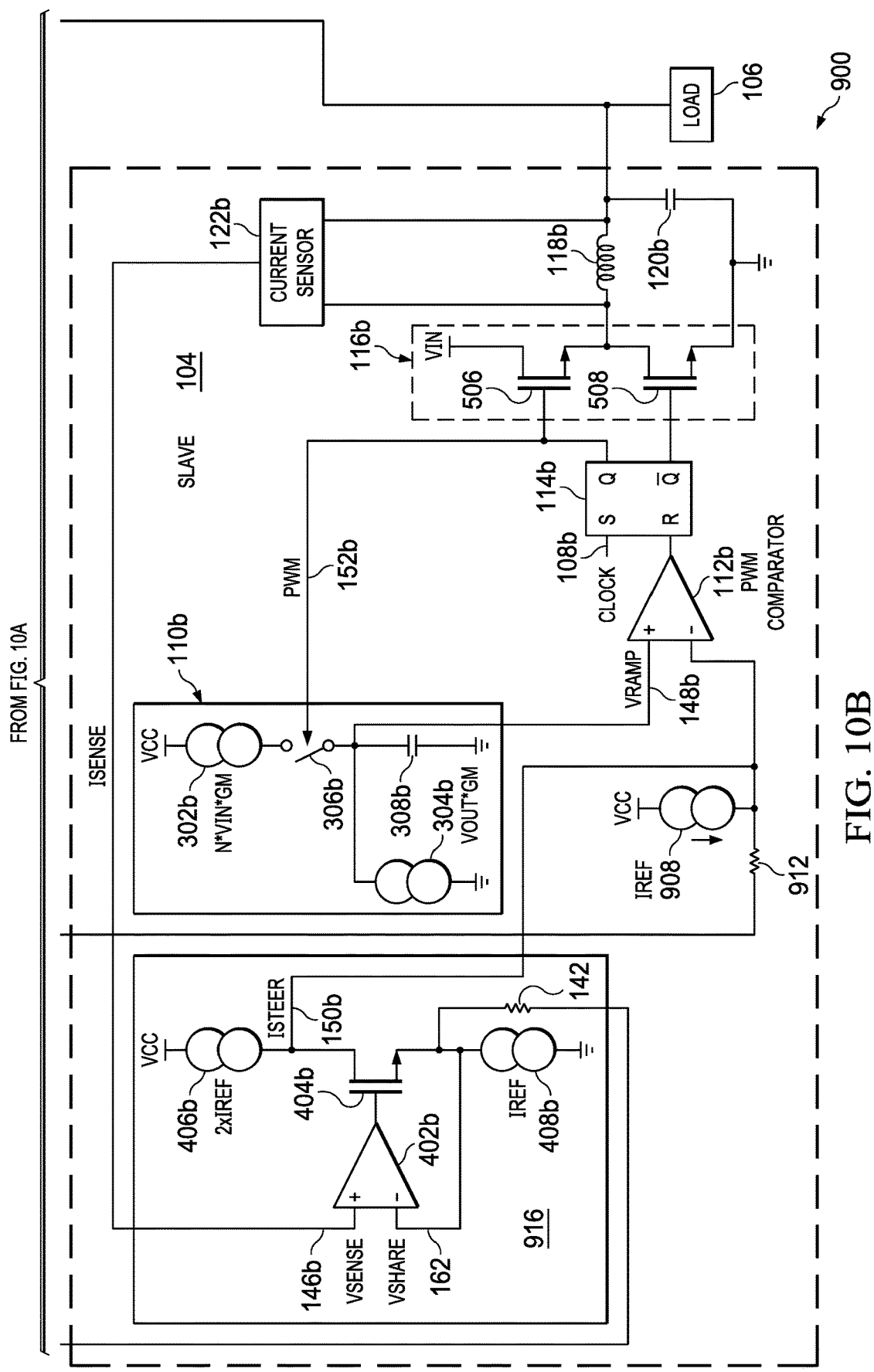

FIGS. 10A-10B depict a schematic illustration of the third power conversion system 900 of FIG. 9 including the emulated ramp generators 110a-b of FIGS. 1 and 3 and the third and fourth current balance circuits 914, 916 of FIG. 9. In the illustrated example of FIGS. 10A-10B, the third and fourth current balance circuits 914, 916 include a respective one of the comparators 402a-b, a respective one of the transistors 404a-b, a respective one of the first DC sources 406a-b, and a respective one of the second DC sources 408a-b of FIG. 4, and a respective one of the third and fourth resistors 140, 142 of FIG. 1. Advantageously, the first and second current balance circuits 124a-b of FIGS. 1 and 4 improve the third and fourth current balance circuits 914, 916 of FIGS. 9-10 by including a respective one of the multiplier circuits 410a-b to determine the on-time adjustment of the power stages 116a-b as a fixed portion of the on-time of the power stages 116a-b so that the gain of the current balance circuits 124a-b are uniform over an entire range of the duty cycle.

Figure 11:
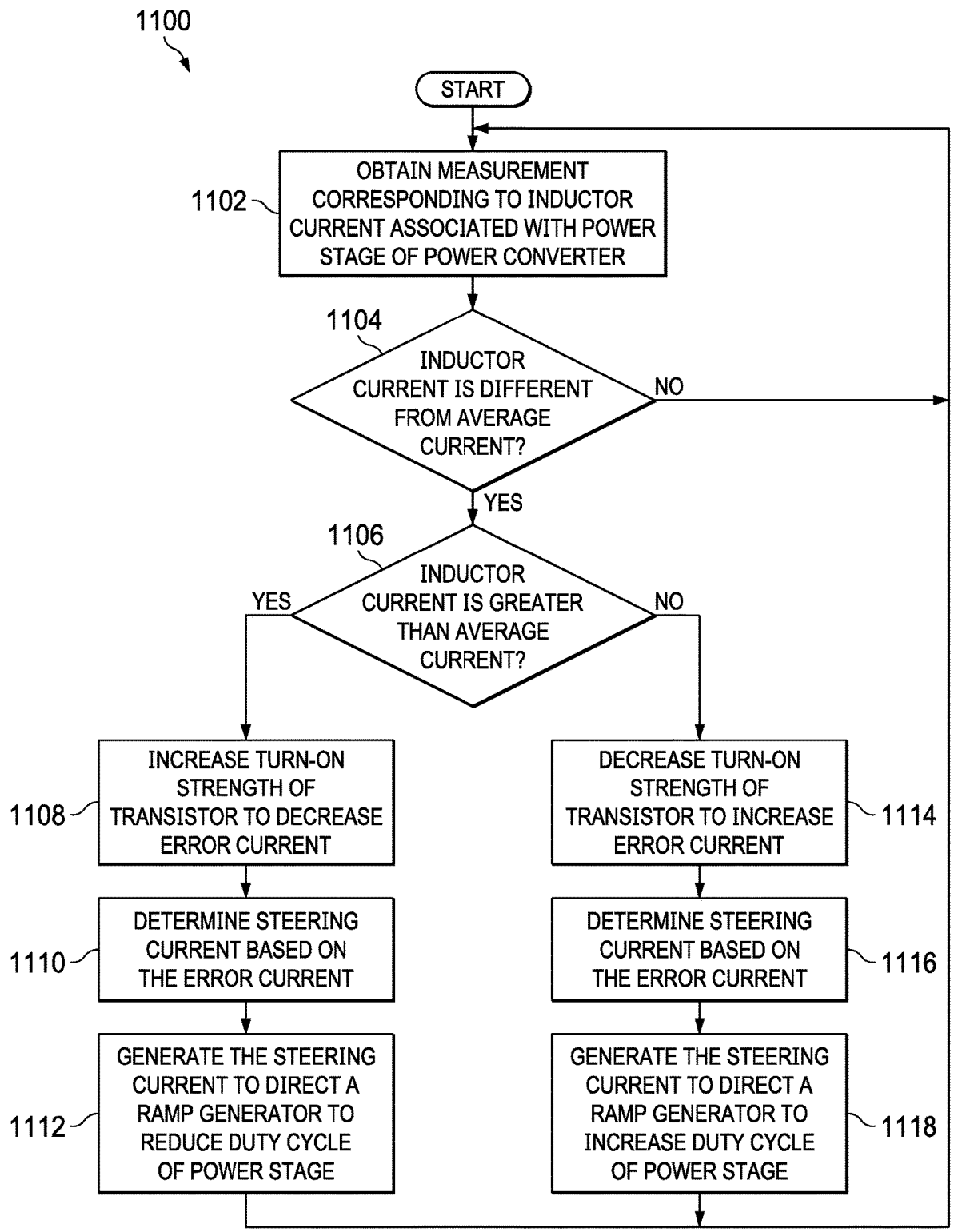
FIG. 11 is a flowchart representative of example machine readable instructions that may be executed to implement the example current balance circuit of FIGS. 1 and 4.

A flowchart representative of example hardware logic, machine readable instructions, hardware implemented state machines, and/or any combination thereof for implementing the current balance circuits 124a-b of FIGS. 1 and 4 is shown in FIG. 11. The machine readable instructions may be an executable program or portion of an executable program for execution by one or more analog or digital circuit(s), logic circuits, programmable processor(s), programmable controller(s), GPU(s), DSP(s), ASIC(s), PLD(s), and/or FPLD(s). The program may be embodied in software stored on a non-transitory computer readable storage medium such as non-volatile memory, volatile memory, etc. Further, although the example program is described with reference to the flowchart illustrated in FIG. 11, many other methods of implementing the example current balance circuits 124a-b may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 11 may be implemented using executable instructions (e.g., computer and/or machine readable instructions) stored on a non-transitory computer and/or machine readable medium such as non-volatile memory, volatile memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 11 is a flowchart representative of example machine readable instructions 1100 that may be executed to implement the example current balance circuits 124a-b of FIGS. 1 and 4 to adjust a duty cycle of the power stages 116a-b of FIG. 1 when the inductor currents are different from an average of the inductor currents. The machine readable instructions 1100 of FIG. 11 begin at block 1102, at which the current balance circuits 124a-b obtain a measurement corresponding to an inductor current associated with a power stage of a power converter. For example, the first current balance circuit 124a can obtain the first VSENSE 146a from the first current sensor 122a, where the first VSENSE 146a corresponds to the first ISENSE 144a generated by the first power stage 116a of the first power converter 102a of FIG. 1.

At block 1104, the current balance circuits 124a-b determine whether the inductor current is different from the average current. For example, the first current balance circuit 124a can compare the first VSENSE 146a to VSHARE 162, where VSHARE 162 is a voltage associated with an average of phase currents such as the master phase current (e.g., as indicated by the first ISENSE 144a), the slave phase current (e.g., as indicated by the second ISENSE 144b), etc. In such examples, the first current balance circuit 124a can determine that the first VSENSE 146a is different from VSHARE 162 when the first VSENSE 146a is greater than or less than VSHARE 162. In other examples, the first current balance circuit 124a can determine that the first VSENSE 146a is not different from VSHARE 162.

If, at block 1104, the current balance circuits 124a-b determine that the inductor current is not different from the average current, control returns to block 1102 to obtain another measurement. If, at block 1104, the current balance circuits 124a-b determine that the inductor current is different from the average current, then, at block 1106, the current balance circuits 124a-b determine whether the inductor current is greater than the average current. For example, the first current balance circuit 124a can determine that the first ISENSE 144a is greater than ISHARE 164 based on the first VSENSE 146a being greater than VSHARE 162. In other examples, the first current balance circuit 124a can determine that the first ISENSE 144a is less than ISHARE 164 based on the first VSENSE 146a being less than VSHARE 162.

If, at block 1106, the current balance circuits 124a-b determine that the inductor current is greater than the average current, then, at block 1108, the current balance circuits 124a-b increase a turn-on strength of a transistor to decrease an error current. For example, the comparator 402a of the first current balance circuit 124a can generate a current to increase a turn-on strength of the transistor 404a of the first current balance circuit 124a to decrease a quantity of IERROR.

At block 1110, the current balance circuits 124a-b determine a steering current based on the error current. For example, the multiplier circuit 410a of the first current balance circuit 124a can determine the first ISTEER 150a based on a first quantity of current for I1, a second quantity current for I2, and a third quantity of current for I3. In such examples, the multiplier circuit 410 can determine the first ISTEER by applying the first, second, and third quantities of I1, I2, and I3, respectively, to the example of Equation (1) above.

At block 1112, the current balance circuits 124a-b generate the steering current to direct a ramp generator to reduce a duty cycle of the power stage. For example, the multiplier circuit 410a of the first current balance circuit 124a can generate the first ISTEER 150a based on determining the first ISTEER 150a using the example of Equation (1) above. In such examples, the first ISTEER 150a can cause an increase in the first current 310 used to charge the capacitor 308 of the first emulated ramp generator 110a. By increasing the first current 130, an upslope of the first ramp signal 148a increases and, thus, causes the first PWM comparator 112a to reset the first latch 114a after a first time to reduce the on-time of the first power stage 116a. By reducing the on-time of the first power stage 116a, the duty cycle of the first power stage 116a decreases and, thus, reduces a quantity of the first ISENSE 144a over the reduced duty cycle. In response to reducing the duty cycle of the power stage at block 1112, control returns to block 1102 to obtain another measurement corresponding to the inductor current associated with the power stage of the power converter.

If, at block 1106, the current balance circuits 124a-b determine that the inductor current is not greater than the average current, then, at block 1114, the current balance circuits 124a-b decrease a turn-on strength of a transistor to increase an error current. For example, the comparator 402a of the first current balance circuit 124a can generate a current to decrease a turn-on strength of the transistor 404a of the first current balance circuit 124a to increase a quantity of IERROR.

At block 1116, the current balance circuits 124*a-b* determine a steering current based on the error current. For example, the multiplier circuit 410*a* of the first current balance circuit 124*a* can determine the first ISTEER 150*a* based on a first quantity of current for I1, a second quantity current for I2, and a third quantity of current for I3. In such examples, the multiplier circuit 410 can determine the first ISTEER by applying the first, second, and third quantities of I1, I2, and I3, respectively, to the example of Equation (1) above.

At block 1118, the current balance circuits 124*a-b* generate the steering current to direct a ramp generator to increase a duty cycle of the power stage. For example, the multiplier circuit 410*a* of the first current balance circuit 124*a* can generate the first ISTEER 150*a* based on determining the first ISTEER 150*a* using the example of Equation (1) above. In such examples, the first ISTEER 150*a* can cause a decrease in the first current 310 used to charge the capacitor 308 of the first emulated ramp generator 110*a*. By decreasing the first current 310, an upslope of the first ramp signal 148*a* decreases and, thus, causes the first PWM comparator 112*a* to reset the first latch 114*a* after a second time (e.g., less than the first time as described above in connection with block 1112) to increase the on-time of the first power stage 116*a*. By increasing the on-time of the first power stage 116*a*, the duty cycle of the first power stage 116*a* increases and, thus, increases a quantity of the first ISENSE 144*a* over the extended duty cycle. In response to extending the duty cycle of the power stage at block 1118, control returns to block 1102 to obtain another measurement corresponding to the inductor current associated with the power stage of the power converter.

From the foregoing, it will be appreciated that example systems, methods, apparatus, and articles of manufacture have been disclosed that improve power converter current output balancing. The disclosed systems, methods, apparatus, and articles of manufacture compare sense current from each phase against a reference current (e.g., an average of all phase currents), adjust an upslope of an emulated current ramp, and control a PWM pulse width of each of the phases based on the adjusted upslope, which adjusts a phase output current until the phase currents balance. Adjusting the upslope of the emulated current ramp ensures that a gain of the current balancing loop is the same for all duty cycles and power stage on-times because the quantity of duty cycle adjustment is a portion of the power stage duty cycle. The disclosed systems, methods, apparatus, and articles of manufacture adjust the upslope of the emulated current ramp based on a normalized error signal using a multiplier circuit, which improves an accuracy and stability of controlling phase output currents with a fixed settling time.

Example methods, apparatus, systems, and articles of manufacture to regulate a switched mode power supply are disclosed herein. Further examples and combinations thereof include the following:

Example 1 includes a power converter comprising a first comparator including a first input, a ramp generator coupled to the first input, and a current balance circuit coupled to the ramp generator, the current balance circuit including a transistor including a first current terminal, a second current terminal, and a gate, a multiplier circuit coupled to the first current terminal, a second comparator coupled to the gate, a first current source coupled to the first current terminal and the multiplier circuit, and a second current source coupled to the second current terminal and the second comparator.

Example 2 includes the power converter of example 1, wherein the power converter is a first power converter, and further including a controller coupled to a second input of the first comparator, the second input to be coupled to a third input of a third comparator of a second power converter different from the first power converter.

Example 3 includes the power converter of example 1, wherein the ramp generator includes a third current source, a switch coupled to the third current source, a first amplifier coupled to a first end of the switch, a second amplifier coupled to a second end of the switch and the first input of the first comparator, and a capacitor coupled to the second amplifier, the second end of the switch, and the first input of the first comparator.

Example 4 includes the power converter of example 3, further including a latch, the latch coupled to an output of the first comparator, a power stage, and the first end of the switch.

Example 5 includes the power converter of example 1, wherein an input of the multiplier circuit is coupled to the first current terminal and the first current source, and an output of the multiplier circuit is coupled to a switch and a third current source of the ramp generator.

Example 6 includes the power converter of example 1, wherein the power converter is a first power converter, and further including a power stage, a current sensor coupled to the power stage and a first input of the second comparator, a current source coupled to a second input of the second comparator, and a first resistor, a first end of the first resistor coupled to the second current terminal, the first end of the first resistor coupled to the second input of the second comparator, the first end of the first resistor coupled to the current source, a second end of the first resistor to be coupled to a second resistor of a second power converter different from the first power converter.

Example 7 includes the power converter of example 1, wherein the power converter is a first power converter and the multiplier circuit is a first multiplier circuit, and further including a first resistor to be coupled to a second resistor of a second power converter different from the first power converter, a first end of the first resistor coupled to the first multiplier circuit, a second end of the first resistor coupled to a first end of the second resistor, a second end of the second resistor coupled to a second multiplier circuit of the second power converter.

Example 8 includes a power converter comprising a ramp generator to output a ramp voltage having a first slope, the ramp voltage to cause a power stage to generate a first output current, a comparator to compare the first output current to a reference current, the reference current based on a second output current associated with another power converter, and a multiplier circuit to obtain a steering current from the ramp generator when the first output current is different from the reference current, the steering current is to cause the ramp generator to generate the ramp voltage based on a second slope different from the first slope.

Example 9 includes the power converter of example 8, wherein the steering current has a fourth quantity, and the multiplier circuit is to obtain a first current having a first quantity based on a first scaling factor, obtain a second current having a second quantity based on a difference between the first output current and the reference current, and obtain a third current having a third quantity based on the reference current.

Example 10 includes the power converter of example 9, wherein the multiplier circuit is to determine the fourth quantity by multiplying the first current and a ratio of the second current and the third current.

Example 11 includes the power converter of example 8, wherein the second slope is greater than the first slope when the first output current is less than the reference current.

Example 12 includes the power converter of example 11, wherein the first output current is less than the reference current when the second output current is greater than the reference current.

Example 13 includes the power converter of example 11, wherein the ramp voltage having the first slope causes the power stage to have a first duty cycle, and the comparator is to cause the power stage to have a second duty cycle shorter than the first duty cycle when the first slope is increased to the second slope.

Example 14 includes the power converter of example 8, wherein the second slope is less than the first slope when the first output current is greater than the reference current.

Example 15 includes the power converter of example 14, wherein the first output current is greater than the reference current when the second output current is less than the reference current.

Example 16 includes the power converter of example 14, wherein the ramp voltage having the first slope causes the power stage to have a first duty cycle, and the comparator is to cause the power stage to have a second duty cycle greater than the first duty cycle when the first slope is decreased to the second slope.

Example 17 includes a power conversion system comprising a first power converter, the first power converter including a first comparator including a first input, a ramp generator coupled to the first input, and a current balance circuit coupled to the ramp generator, the current balance circuit including a transistor, a multiplier circuit coupled to the transistor, a second comparator coupled to the transistor, a first current source coupled to the transistor and the multiplier circuit, and a second current source coupled to the transistor and the second comparator, a second power converter coupled to the first power converter, and a load coupled to the first power converter and the second power converter.

Example 18 includes the power conversion system of example 17, wherein the current balance circuit is a first current balance circuit, the first current balance circuit is coupled to a first resistor of the first power converter, and the second power converter further including a second resistor coupled to the first resistor, a second current balance circuit coupled to the second resistor, and a third comparator including a third input coupled to a second input of the first comparator.

Example 19 includes the power conversion system of example 17, wherein the ramp generator is to increase a ramp voltage at the first input of the first comparator based on a first slope, the ramp voltage to cause a first power stage of the first power converter to generate a first output current, the second comparator is to compare the first output current to a reference current, the reference current based on a second output current associated with the second power converter, and the multiplier circuit is to obtain a steering current from the ramp generator when the first output current is different from the reference current, the steering current is to cause the ramp generator to generate the ramp voltage based on a second slope different from the first slope.

Example 20 includes the power conversion system of example 19, wherein the first slope causes the first power stage to have a first duty cycle, the first comparator is to cause the first power stage to have a second duty cycle shorter than the first duty cycle when the ramp voltage is increased based on the second slope when the second power converter is to cause a second power stage of the second power converter to adjust from a third duty cycle to a fourth duty cycle longer than the third duty cycle.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A power converter comprising:
   a first comparator including a first input;
   a ramp generator coupled to the first input; and
   a current balance circuit coupled to the ramp generator, the current balance circuit including:
      a transistor including a first current terminal, a second current terminal, and a gate;
      a multiplier circuit coupled to the first current terminal;
      a second comparator coupled to the gate;
      a first current source coupled to the first current terminal and the multiplier circuit; and
      a second current source coupled to the second current terminal and the second comparator.

2. The power converter of claim 1, wherein the power converter is a first power converter, and further including a controller coupled to a second input of the first comparator, the second input to be coupled to a third input of a third comparator of a second power converter different from the first power converter.

3. The power converter of claim 1, wherein the ramp generator includes:
   a third current source;
   a switch coupled to the third current source;
   a first amplifier coupled to a first end of the switch;
   a second amplifier coupled to a second end of the switch and the first input of the first comparator; and
   a capacitor coupled to the second amplifier, the second end of the switch, and the first input of the first comparator.

4. The power converter of claim 3, further including a latch, the latch coupled to an output of the first comparator, a power stage, and the first end of the switch.

5. The power converter of claim 1, wherein an input of the multiplier circuit is coupled to the first current terminal and the first current source, and an output of the multiplier circuit is coupled to a switch and a third current source of the ramp generator.

6. The power converter of claim 1, wherein the power converter is a first power converter, and further including:
   a power stage;
   a current sensor coupled to the power stage and a first input of the second comparator;
   a current source coupled to a second input of the second comparator; and
   a first resistor, a first end of the first resistor coupled to the second current terminal, the first end of the first resistor coupled to the second input of the second comparator, the first end of the first resistor coupled to the current source, a second end of the first resistor to be coupled to a second resistor of a second power converter different from the first power converter.

7. The power converter of claim 1, wherein the power converter is a first power converter and the multiplier circuit is a first multiplier circuit, and further including a first resistor to be coupled to a second resistor of a second power converter different from the first power converter, a first end of the first resistor coupled to the first multiplier circuit, a second end of the first resistor coupled to a first end of the second resistor, a second end of the second resistor coupled to a second multiplier circuit of the second power converter.

8. A power converter comprising:
a ramp generator to output a ramp voltage having a first slope, the ramp voltage to cause a power stage to generate a first output current;
a comparator to compare the first output current to a reference current, the reference current based on a second output current associated with another power converter; and
a multiplier circuit to obtain a steering current from the ramp generator when the first output current is different from the reference current, the steering current is to cause the ramp generator to generate the ramp voltage based on a second slope different from the first slope.

9. The power converter of claim 8, wherein the steering current has a fourth quantity, and the multiplier circuit is to:
obtain a first current having a first quantity based on a first scaling factor;
obtain a second current having a second quantity based on a difference between the first output current and the reference current; and
obtain a third current having a third quantity based on the reference current.

10. The power converter of claim 9, wherein the multiplier circuit is to determine the fourth quantity by multiplying the first current and a ratio of the second current and the third current.

11. The power converter of claim 8, wherein the second slope is greater than the first slope when the first output current is less than the reference current.

12. The power converter of claim 11, wherein the first output current is less than the reference current when the second output current is greater than the reference current.

13. The power converter of claim 11, wherein the ramp voltage having the first slope causes the power stage to have a first duty cycle, and the comparator is to cause the power stage to have a second duty cycle shorter than the first duty cycle when the first slope is increased to the second slope.

14. The power converter of claim 8, wherein the second slope is less than the first slope when the first output current is greater than the reference current.

15. The power converter of claim 14, wherein the first output current is greater than the reference current when the second output current is less than the reference current.

16. The power converter of claim 14, wherein the ramp voltage having the first slope causes the power stage to have a first duty cycle, and the comparator is to cause the power stage to have a second duty cycle greater than the first duty cycle when the first slope is decreased to the second slope.

17. A power conversion system comprising:
a first power converter, the first power converter including:
a first comparator including a first input;
a ramp generator coupled to the first input; and
a current balance circuit coupled to the ramp generator, the current balance circuit including:
a transistor;
a multiplier circuit coupled to the transistor;
a second comparator coupled to the transistor;
a first current source coupled to the transistor and the multiplier circuit; and
a second current source coupled to the transistor and the second comparator;
a second power converter coupled to the first power converter; and
a load coupled to the first power converter and the second power converter.

18. The power conversion system of claim 17, wherein the current balance circuit is a first current balance circuit, the first current balance circuit is coupled to a first resistor of the first power converter, and the second power converter further including:
a second resistor coupled to the first resistor;
a second current balance circuit coupled to the second resistor; and
a third comparator including a third input coupled to a second input of the first comparator.

19. The power conversion system of claim 17, wherein the ramp generator is to increase a ramp voltage at the first input of the first comparator based on a first slope, the ramp voltage to cause a first power stage of the first power converter to generate a first output current;
the second comparator is to compare the first output current to a reference current, the reference current based on a second output current associated with the second power converter; and
the multiplier circuit is to obtain a steering current from the ramp generator when the first output current is different from the reference current, the steering current is to cause the ramp generator to generate the ramp voltage based on a second slope different from the first slope.

20. The power conversion system of claim 19, wherein the first slope causes the first power stage to have a first duty cycle, the first comparator is to cause the first power stage to have a second duty cycle shorter than the first duty cycle when the ramp voltage is increased based on the second slope when the second power converter is to cause a second power stage of the second power converter to adjust from a third duty cycle to a fourth duty cycle longer than the third duty cycle.

* * * * *